US012381467B2

(12) United States Patent
Gonthier

(10) Patent No.: US 12,381,467 B2
(45) Date of Patent: Aug. 5, 2025

(54) VOLTAGE CONVERTER

(71) Applicant: STMicroelectronics LTD, Kowloon (HK)

(72) Inventor: Laurent Gonthier, Shenzhen (CN)

(73) Assignee: STMicroelectronics LTD, Tsim Sha Tsui (HK)

( * ) Notice: Subject to any disclaimer, the term of this patent is extended or adjusted under 35 U.S.C. 154(b) by 223 days.

(21) Appl. No.: 18/209,744

(22) Filed: Jun. 14, 2023

(65) Prior Publication Data

US 2023/0412084 A1    Dec. 21, 2023

(30) Foreign Application Priority Data

Jun. 17, 2022  (FR) ..................................... 2205931

(51) Int. Cl.
| | | |
|---|---|---|
| *H02M 1/42* | (2007.01) | |
| *H02M 1/00* | (2006.01) | |
| *H02M 7/145* | (2006.01) | |
| *H02M 7/155* | (2006.01) | |
| *H02M 7/162* | (2006.01) | |
| *H02M 3/335* | (2006.01) | |

(52) U.S. Cl.
CPC ......... *H02M 1/0006* (2021.05); *H02M 7/145* (2013.01); *H02M 7/155* (2013.01); *H02M 7/1555* (2013.01); *H02M 7/1623* (2013.01); *H02M 1/007* (2021.05); *H02M 1/4225* (2013.01); *H02M 1/4233* (2013.01); *H02M 3/33571* (2021.05)

(58) Field of Classification Search
CPC .... H02M 1/0006; H02M 1/007; H02M 7/145; H02M 7/155; H02M 7/1555; H02M 7/1623; H02M 3/33571; H02M 1/4225; H02M 1/4233
See application file for complete search history.

(56) References Cited

U.S. PATENT DOCUMENTS

| | | |
|---|---|---|
| 5,796,599 A | 8/1998 | Raonic et al. |
| 6,255,806 B1 | 7/2001 | Seppanen et al. |
| 8,222,872 B1 | 7/2012 | Melanson et al. |

(Continued)

FOREIGN PATENT DOCUMENTS

| | | |
|---|---|---|
| EP | 1626493 A1 | 2/2006 |
| EP | 3595154 A1 | 1/2020 |

(Continued)

OTHER PUBLICATIONS

INPI Search Report and Written Opinion for priority application, FR 2205931, report dated Jan. 27, 2023, 10 pgs.

*Primary Examiner* — Gary L Laxton
(74) *Attorney, Agent, or Firm* — Crowe & Dunlevy LLC

(57) ABSTRACT

The present description concerns a circuit for converting from a first alternating voltage to a second voltage. The circuit includes: a first thyristor; a first control circuit of the first thyristor; a power factor correction circuit comprising a coil; and a first circuit configured to convert a third voltage into a fourth DC voltage. The third voltage corresponds to a difference between a potential at a first node connected to an output node of the coil and a reference potential. The fourth DC voltage is configured to supply the first control circuit of the first thyristor, and is referenced with respect to the same reference potential as the third voltage.

15 Claims, 15 Drawing Sheets

(56) References Cited

U.S. PATENT DOCUMENTS

| | | | |
|---|---|---|---|
| 2007/0115695 A1 | 5/2007 | Lou et al. | |
| 2016/0308454 A1* | 10/2016 | Kawai | H02M 5/458 |
| 2019/0312520 A1 | 10/2019 | Yoshimitsu et al. | |
| 2020/0395866 A1* | 12/2020 | Gonthier | H03K 17/74 |

FOREIGN PATENT DOCUMENTS

| | | |
|---|---|---|
| EP | 3758209 A1 | 12/2020 |
| FR | 2859580 A1 | 3/2005 |
| WO | 2020222889 A1 | 11/2020 |

\* cited by examiner

VOLTAGE CONVERTER

PRIORITY CLAIM

This application claims the priority benefit of French Application for Patent No. 2205931, filed on Jun. 17, 2022, the content of which is hereby incorporated by reference in its entirety to the maximum extent allowable by law.

TECHNICAL FIELD

The present disclosure generally concerns electronic devices and circuits. The present disclosure more particularly concerns voltage converter circuits and, more particularly, circuits configured to convert an AC voltage into another AC voltage or into a DC voltage.

BACKGROUND

Power conversion, in particular the conversion of an AC voltage into another AC voltage or a DC voltage, is a constantly-evolving and constantly-developing technical field.

It would be desirable to at least partly improve certain aspects of known voltage converter circuits.

There is a need for higher-performance voltage converter circuits.

There exists a need for voltage converter circuits using a single power supply voltage.

There exists a need for voltage converter circuits using a single number of power supply voltage sources.

There exists a need for voltage converter circuits using a single power supply voltage source.

There exists a need for voltage converter circuits having a smaller bulk.

There exists a need for voltage converter circuits having better performances.

SUMMARY

An embodiment overcomes all or part of the disadvantages of known voltage converter circuits.

An embodiment provides a converter circuit of a first AC voltage into a second voltage comprising: a first thyristor; a first control circuit of the first thyristor; a power factor corrector circuit comprising a coil; and a first circuit configured to convert a third voltage into a fourth dc voltage, wherein the third voltage corresponds to the potential difference between the potential on a first node coupled to an output node of the coil and a reference potential; and the fourth dc voltage is configured to supply the first control circuit of the first thyristor, and is referenced to the same reference potential as the third voltage.

According to an embodiment, the first circuit comprises: a second node receiving the third voltage; a third node supplying the fourth voltage; and a fourth reference node receiving the reference voltage.

According to an embodiment, the first circuit comprises: a first bipolar transistor having its collector coupled to the second node, and its emitter coupled to the third node; a first Zener diode having its anode coupled to the third node and its cathode coupled to the base of the first transistor; a second Zener diode having its anode coupled to the fourth node and its cathode coupled to the base of the first transistor; and a first capacitor coupling the third node to the fourth node.

According to an embodiment, the first circuit comprises: a second capacitor having a first electrode coupled to the second node; a third Zener diode having its anode coupled to the fourth node and its cathode coupled to the second electrode of the second capacitor; a first diode having its anode coupled to the anode of the third Zener diode and its cathode coupled to the third node; and a third capacitor coupling the third node with the fourth node.

According to an embodiment, the first circuit further comprises a precharge circuit comprising a second diode having its cathode coupled to the third node and its anode coupled to a fifth node receiving a supply voltage of the convertor circuit.

According to an embodiment, the first circuit comprises: a fourth Zener diode having an anode coupled to the second node; a fourth capacitor having a first electrode coupled to the cathode of the fourth Zener diode; a fifth Zener diode having its anode coupled to the fourth node and its cathode coupled to a second electrode of the fourth capacitor; a third diode having its anode coupled to the cathode of the fifth Zener diode and its cathode coupled to the third node; a fifth capacitor coupling the third node and the fourth node; a sixth diode having its anode coupled to the cathode of the fourth Zener diode and its cathode coupled to the fourth node; and a sixth capacitor coupling the fourth node with the second node.

According to an embodiment, the first circuit is configured to furnish further, a fifth DC voltage configured to supply a second circuit of a second transistor of NMOS-type being part of the power factor corrector circuit.

According to an embodiment, the first node is the output node of the coil.

According to an embodiment, the first node is coupled to the output node of the coil via at least one NMOS-type transistor.

According to an embodiment, the first node is coupled to the output node of the coil via a diode.

According to an embodiment, the first node is coupled to the output node of the coil via at least two NMOS-type transistors According to an embodiment, the circuit comprises a first converting stage comprising: the first thyristor; the first control circuit of the first thyristor; a power factor corrector circuit, the first node being an output node of the first converting stage.

According to an embodiment, the circuit further comprises a second thyristor and a second control circuit.

According to an embodiment, the second voltage is an ac voltage.

According to an embodiment, the second voltage is a dc voltage.

BRIEF DESCRIPTION OF THE DRAWINGS

The foregoing features and advantages, as well as others, will be described in detail in the rest of the disclosure of specific embodiments given by way of illustration and not limitation with reference to the accompanying drawings, in which.

DETAILED DESCRIPTION

Like features have been designated by like references in the various figures. In particular, the structural and/or functional features that are common among the various embodiments may have the same references and may refer to identical structural, dimensional and material properties.

For the sake of clarity, only the steps and elements that are useful for an understanding of the embodiments described herein have been illustrated and described in detail.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless otherwise specified, when reference is made to absolute positional qualifiers, such as the terms "front", "back", "top", "bottom", "left", "right", etc., or to relative positional qualifiers, such as the terms "above", "below", "upper", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

Figure 1:
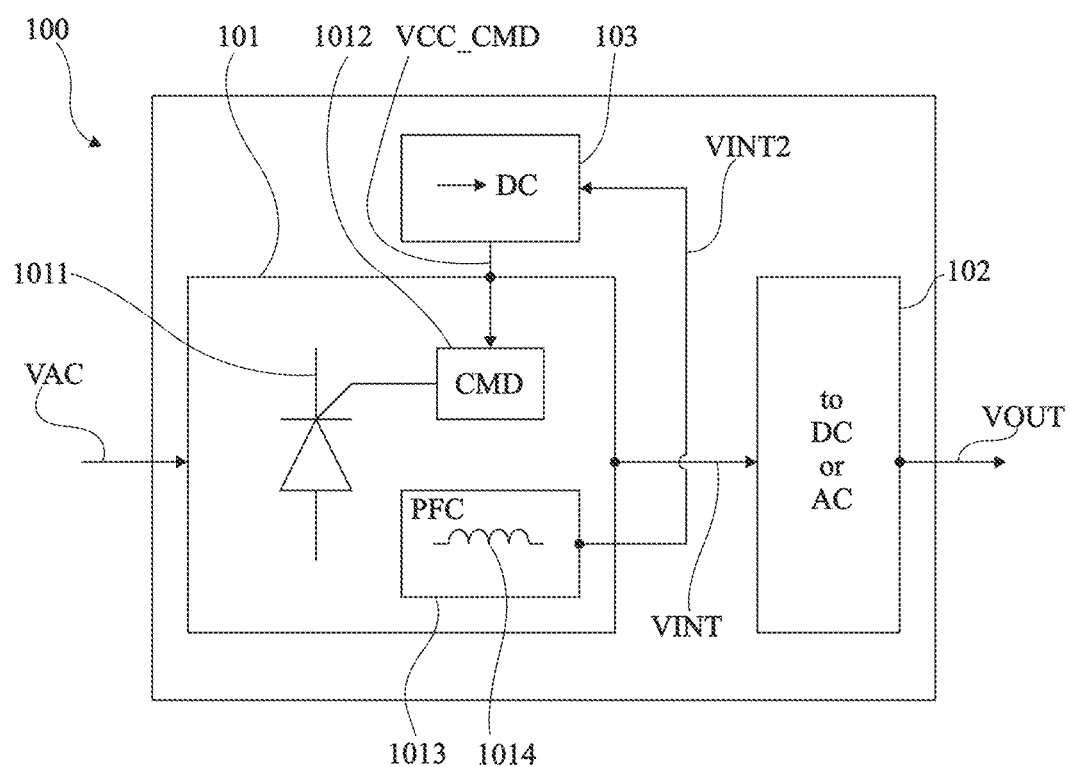
FIG. 1 very schematically shows in the form of blocks an embodiment of a voltage converter.

FIG. 1 very schematically shows in the form of blocks an embodiment of a voltage converter 100.

Voltage converter 100 is a circuit configured to convert an ac input voltage, noted voltage VAC, into an output voltage VOUT. Output voltage VOUT may be an ac voltage or a dc voltage.

Voltage converter 100 comprises a first converting stage 101, also referred to as a stage for adapting input voltage VAC, and a second converting stage 102 (to DC or AC) delivering output voltage VOUT. First converting stage 101 supplies an intermediate voltage VINT to second converting stage 102.

First converting stage 101 comprises: at least one thyristor 1011; a circuit 1012 for controlling thyristor 1011; and a power factor correction circuit 1013 (Power Factor Correction, PFC) comprising at least one coil 1014.

Control circuit 1012 delivers a control voltage to the gate of thyristor 1011. Control circuit 1012 is a control circuit, or driver, or close control circuit, dedicated to transmitting control signals to thyristor 1011. According to an example, control circuit 1012 receives a control signal from a control unit of device 100. This control signal is not configured to being directly processed by thyristor 1011. Driver 1012 is configured to process the control signal of the control unit to supply the control voltage to the gate of thyristor 1011.

Second converting stage 102 enables to convert intermediate voltage VINT into output voltage VOUT. Second converting stage 102 may, according to a first example, convert voltage VINT into a dc voltage or, according to a second example, convert voltage VINT into an ac voltage.

According to an embodiment, converter 100 further comprises a circuit 103 configured to supply a dc power supply voltage VCC_CMD to control circuit 1012. According to an example, circuit 103 may form part of first converting stage 101.

Circuit 103 is a circuit configured to convert an internal voltage VINT2 of first converting stage 101 into dc power supply voltage VCC_CMD, voltages VCC_CMD and VINT2 being referenced with respect to a same node. Thus, circuit 103 is a circuit configured to convert an ac voltage into a dc voltage, or to convert a first dc voltage into a second dc voltage.

Internal voltage VINT2 corresponds to the potential difference between a first potential taken at the level of a node coupled to the output of coil 1014 of power factor correction circuit 1013, and a second reference potential taken at the level of a node of stage 101. In other words, the first potential of internal voltage VINT2 is taken at a node coupled to a terminal of coil 1014 different from the terminal of the coil receiving input voltage VAC. The second reference potential of voltage VINT is the potential of a reference node of circuit 103 connected to a node of stage 201. According to a variant, internal potential VINT2 may be taken at the level of a node belonging to second converting stage 102. Specific examples of potential VINT2 are described hereafter.

Dc power supply voltage VCC_CMD corresponds to the potential difference between an output node of circuit 103 and of the second reference potential, identical to the second reference potential of voltage VINT2.

An advantage of this embodiment is that it enables to use a potential derived from input potential VAC to power control circuit 1012, and thus to avoid having to supply a specific power supply voltage for control circuit 1012. Indeed, it is well known to use an external power supply circuit, such as a magnetic transformer, to supply this power supply voltage. The use of this embodiment thus enables to decrease the number of components of the voltage converting circuit, and to decrease its bulk.

More detailed examples of a voltage converter are described in relation with FIGS. 2 to 20.

Figure 2:
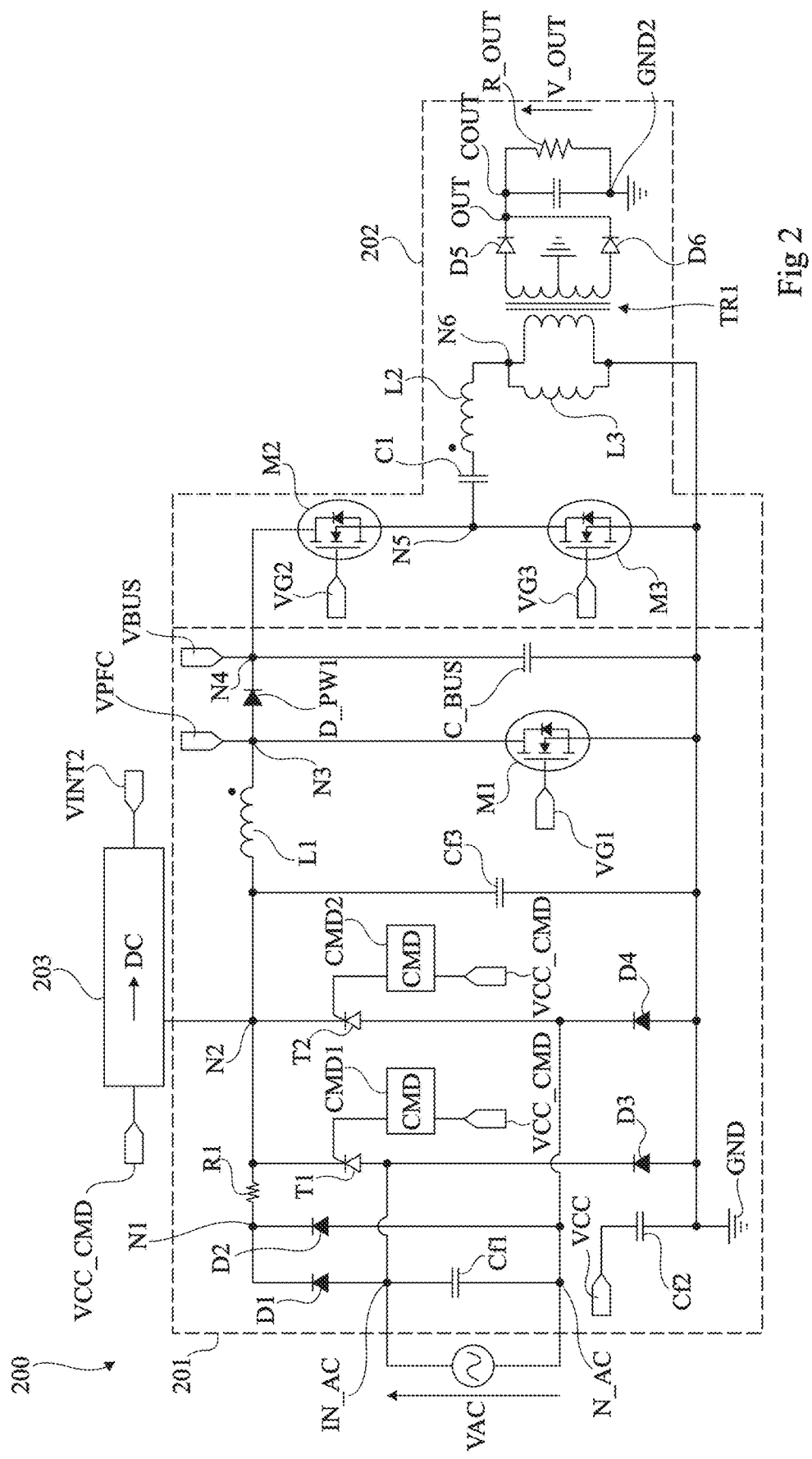
FIG. 2 shows an electric diagram, partially in the form of blocks, of a first embodiment of a voltage converter.

FIG. 2 is a first example of embodiment of a voltage converter 200 of the type of the voltage converter 100 described in relation with FIG. 1. More particularly, FIG. 2 is an electric diagram, partially in the form of blocks, of voltage converter 200.

Like the voltage converter 100 of FIG. 1, converter 200 comprises: a first converting stage 201; a second converting stage 202; and a circuit 203 (→DC) configured to convert an internal voltage of first converting stage 201 into a power supply voltage.

As described in relation with FIG. 1, first converting stage 201 receives ac input voltage VAC and outputs an intermediate voltage VBUS, corresponding to the intermediate voltage VINT in FIG. 1. Second converting stage 202 receives intermediate voltage VBUS and provides the output voltage VOUT. Circuit 203 receives an internal voltage VINT2 of converting stage 201 to provide a power supply voltage VCC_CMD.

First converting stage 201 comprises two input nodes IN_AC and N_AC receiving ac input voltage VAC.

Stage 201 further comprises a voltage rectification diode bridge comprising four diodes D1, D2, D3, and D4. The diode bridge is configured to rectify voltage VAC. According to an example, diode D1 has its anode coupled, preferably connected, to node IN_AC, and its cathode coupled, preferably connected, to an output node N1 of the diode bridge. Diode D2 has its anode coupled, preferably connected, to node N_AC and its cathode coupled, preferably connected, to node N1. Diode D3 has its anode coupled, preferably connected, to a node GND receiving its reference potential, for example, the ground, and its cathode coupled, preferably connected, to node IN_AC. Diode D4 has its anode coupled, preferably connected, to node GND and its cathode coupled, preferably connected, to node N_AC. The output voltage of the diode bridge is the voltage between nodes N1 and GND.

Stage 201 further comprises two thyristors T1 and T2 and their respective control circuits CMD1 (CMD) and CMD2 (CMD). Thyristor T1 has its cathode coupled, preferably connected, to anode N2, and its anode coupled, preferably connected, to node IN_AC. The gate of thyristor T1 is coupled, preferably connected, to an output of control circuit CMD1. Control circuit CMD1 is powered with the voltage VCC_CMD delivered by circuit 203. Thyristor T2 has its cathode coupled, preferably connected, to a node N2, and its anode coupled, preferably connected, to node N_AC. The gate of thyristor T2 is coupled, preferably connected, to an output of control circuit CMD2. Control circuit CMD2 is powered with the voltage VCC_CMD delivered by circuit 203. Stage 201 further comprises a resistor R1 arranged between nodes N1 and N2. More detailed examples of control circuits CMD1 and CMD2 are described in relation with FIGS. 3 and 4.

Stage 201 further comprises a power factor correction circuit comprising a coil L1, a transistor M1, and a diode D_FW1. Coil L1 comprises a first terminal coupled, preferably connected, to node N2, also called input terminal of coil L1. Coil L1 comprises a second terminal coupled, preferably connected, to a node N3, also called output terminal of coil L1. Transistor M1 is an N-type MOS transistor, that is, an insulated gate field-effect transistor, also called MOSFET (Metal Oxide Semiconductor Field Effect Transistor), having an N-type channel region. The source of transistor M1 is coupled, preferably connected, to node GND, and the drain of transistor M1 is coupled, preferably connected, to node N3. The gate of transistor M1 receives a control potential VG1. Diode D_FW1 has its anode coupled, preferably connected, to node N3, and its cathode coupled, preferably connected, to an output node N4 of the power factor correction circuit.

First converting stage 201 further comprises a capacitive element C_BUS placed between nodes N4 and GND, but also optionally comprises one or a plurality of filtering capacitors, among which: a capacitor Cf1 placed between nodes IN_AC and N_AC; a capacitor Cf2 placed between node GND and a node receiving a dc power supply potential VCC of converter 200; and a capacitor Cf3 placed between nodes N2 and GND.

The intermediate voltage VBUS delivered by stage 201 is the potential difference between nodes N4 and GND.

The second converting stage 202 shown in FIG. 2 is an example of a converting stage 202 enabling to supply a dc voltage VOUT. Other types of stage 202 may be envisaged by, and are within the abilities of, those skilled in the art. In particular, those skilled in the art will be capable of imagining a converting stage 202 enabling to supply an ac output voltage VOUT.

Second stage 202 comprises a switching circuit comprising two transistors M2 and M3. Transistors M2 and M3 are N-type MOS transistors. The source of transistor M2 is coupled, preferably connected, to a node N5, and the drain of transistor M2 is coupled, preferably connected, to node N4. The gate of transistor M2 receives a control potential VG2. The source of transistor M3 is coupled, preferably connected, to node GND, and the drain of transistor M3 is coupled, preferably connected, to node N5. The gate of transistor M3 receives a control potential VG3.

Second converting stage 202 further comprises a resonance converter circuit comprising a capacitor C1 and two coils L2 and L3. A first electrode of capacitor C1 is coupled, preferably connected, to node N5 forming the input node of second converting stage 202. A first terminal of coil L2 is coupled, preferably connected, to the second electrode of capacitor C1, and a second terminal of coil L2 is coupled, preferably connected, to a node N6. A first terminal of coil L3 is coupled, preferably connected, to node N6, and a second terminal of coil L2 is coupled, preferably connected, to node GND forming the second input node of second converting stage 202.

Second converting stage 202 further comprises a transformer TR1 comprising two input terminals and two output terminals. Each input terminal of transistor TR1 is coupled to a terminal of coil L3. In other words, a first input terminal of transformer TR1 is coupled, preferably connected, to node N6, and a second input terminal of transformer TR1 is coupled, preferably connected, to node GND.

Second converting stage 202 further comprises two diodes D5 and D6 placed at the level of the output terminals of transformer TR1. The anode of diode D5 is coupled, preferably connected, to a first output terminal of transformer TR1, and the cathode of diode D5 is coupled, preferably connected, to a node OUT, forming the output node of stage 202. The anode of diode D6 is coupled, preferably connected, to a second output terminal of transformer TR1, and the cathode of diode D6 is coupled, preferably connected, to node OUT.

Second converting stage 202 further comprises an RC circuit comprising a resistor R_OUT and a capacitor C_OUT coupled in parallel. In other words, a first electrode of capacitor C_OUT is coupled, preferably connected, to node OUT, and a second electrode of capacitor C_OUT is coupled, preferably connected, to node GND. A first terminal of resistor R_OUT is coupled, preferably connected, to node OUT, and a second terminal of resistor R_OUT is coupled, preferably connected, to a reference node GND2, corresponding to a second ground.

The output voltage VOUT of second converting stage 202 is the potential difference between nodes OUT and GND2.

Circuit 203 is shown in FIG. 2 by a block coupled to node N2 of stage 201, supplying voltage VCC_CMD, referenced with respect to node N2, and receiving an internal voltage VINT2, referenced with respect to the potential of node N2. Internal voltage VINT2 corresponds to the difference between an internal potential and the potential present at the level of node N2. The internal potential may be taken at the level of different nodes of stage 201, for example, at the level of nodes N3, N4 or for example at the level of node N5 of stage 202. Several examples of circuit 203 as well as their operation, according to the selected voltage VINT2, are described in relation with FIGS. 5 to 13. More particularly, three examples of circuit 203 are described, and several examples of operation of each example of circuit 203 are detailed.

Figure 3:
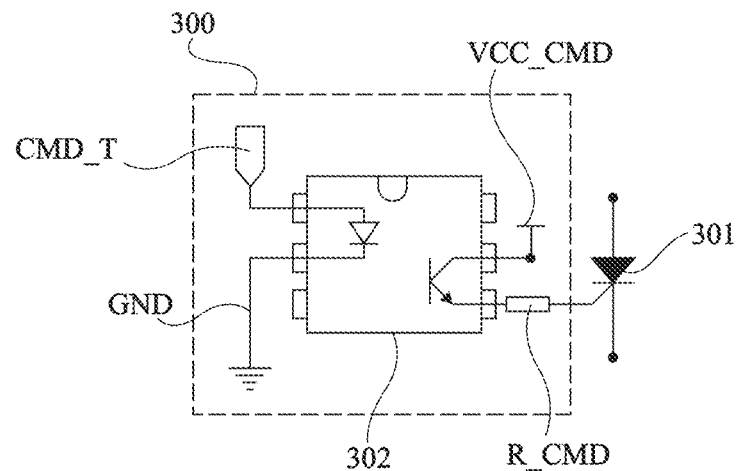
FIG. 3 shows an electric diagram of a first example of embodiment of a portion of the converter of FIG. 1 or of FIG. 2.

FIG. 3 is an electric diagram of an example of embodiment of a circuit 300 for controlling a thyristor 301. Control circuit 300 is an example of a control circuit capable of being used in a converter of the type of the converter 100 described in relation with FIG. 1 or of the type of the converter 200 described in relation with FIG. 2.

Control circuit 300 comprises a phototransistor 302. In practice, phototransistor 302 is an NPN-type bipolar transistor having its base controlled by the current flowing through a photodiode. The photodiode receives at the level of its anode a control potential CMD_T and is coupled, preferably connected, by its cathode to a node GND receiving a reference potential, for example, the ground. The bipolar transistor receives, at the level of its collector, the power supply voltage VCC_CMD supplied by a circuit of the type of the circuits 103 of FIG. 1 or 203 of FIG. 2.

Control circuit 300 further comprises a resistor R_CMD having a first terminal coupled, preferably connected, to the emitter of the bipolar transistor of phototransistor 302 and having a second terminal coupled, preferably connected, to the gate of thyristor 301.

Figure 4:
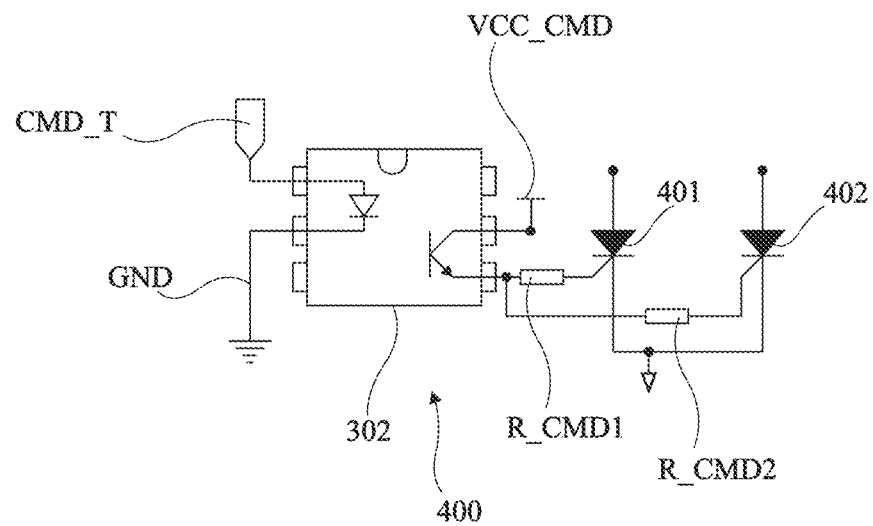
FIG. 4 shows an electric diagram of a second example of embodiment of a portion of the converter of FIG. 1 or of FIG. 2.

As previously mentioned, circuit 300 may be used like the control circuit CMD1 or CMD2 of the thyristor T1 or T2 of FIG. 2. In this case, the converter 200 of FIG. 2 may comprise two distinct control circuits CMD1 and CMD2 enabling to independently control thyristors T1 and T2. According to a variant, converter 200, and more particularly its first converting stage 201, may comprise a thyristor control circuit common to a plurality of thyristors. FIG. 4 shows a control circuit 400 that may enable to apply a same control voltage to two thyristors 401 and 402.

FIG. 4 thus is an electric diagram of an example of embodiment of a circuit 400 for controlling two thyristors 401 and 402.

Control circuit 400 is similar to the control circuit 300 described in relation with FIG. 3, with the difference that control circuit 400 comprises two resistors R_CDM1 and R_CMD2 instead of resistor R_CMD.

Thus, control circuit 400 comprises: the phototransistor 302 of FIG. 3 powered with the same potentials as those described in relation with FIG. 3; resistor R_CMD1 coupling, preferably connecting, the emitter of the bipolar transistor of phototransistor 302 to the gate of thyristor 401; and resistor R_CMD1 coupling, preferably connecting, the emitter of the bipolar transistor of phototransistor 302 to the gate of thyristor 402.

Figure 5:
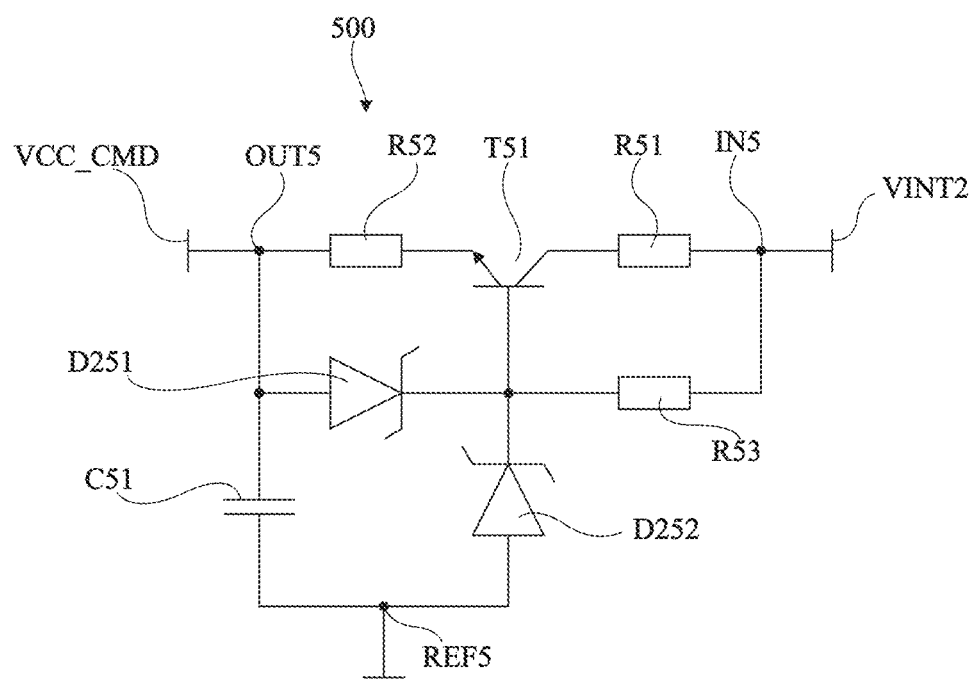
FIG. 5 shows an electric diagram of a first example of embodiment of a circuit configured to convert a voltage forming part of the converter of FIG. 1 or of FIG. 2.

FIG. 5 is an electric diagram of a first example of embodiment of a circuit 500 configured to convert an internal voltage of a converter into a power supply voltage. Circuit 500 is an example of a circuit capable of being used as a circuit 203 in a converter of the type of the converter 200 described in relation with FIG. 2.

Like the circuit 203 described in relation with FIG. 2, circuit 500 receives, between an input node IN5 and a reference node REFS, internal voltage VINT2, and supplies, between an output node OUT5 and a reference node REFS, dc power supply voltage VCC_CMD configured to power the circuit(s) for controlling the thyristors T1 and T2 of converter 200. Reference node REFS is coupled, preferably connected, to node N2 of converter 200.

Further, as previously described, internal voltage VINT2 is a voltage taken at the level of the first converting stage 201 or of the second stage 202 of the converter 200 of FIG. 2, at a node coupled to the output of inductance L1. According to an example, voltage VINT2 may be taken at the level of node N3, N4, or N5, being referenced to node N2 of converter 200. The operation of the case where voltage VINT2 is taken at the level of node is N4 described in relation with FIG. 6, and the operation of the case where voltage VINT2 is taken at the level of node N5 is described in relation with FIG. 7.

Circuit 500 is a linear power supply circuit comprising a first branch comprising, in series between nodes IN5 and OUT5, a resistor R51, an NPN-type bipolar transistor T51, and a resistor R52. More particularly, a first terminal of resistor R51 is coupled, preferably connected, to node IN5, and a second terminal of resistor R51 is coupled, preferably connected, to the collector of transistor T51. The emitter of transistor T51 is coupled, preferably connected, to a first terminal of resistor R52. A second terminal of transistor R52 is coupled, preferably connected, to node OUT5.

Circuit 500 further comprises a second branch comprising, in series between nodes IN5 and OUT5, a resistor R53 and a Zener diode DZ51. A first terminal of resistor R53 is coupled, preferably connected, to node IN5, and a second terminal of resistor R53 is coupled, preferably connected, to the cathode of diode DZ51. The anode of diode DZ51 is coupled, preferably connected, to node OUT5. Further, the base of transistor T51 is coupled, preferably connected, to the cathode of diode DZ51.

Circuit 500 further comprises a second Zener diode DZ52 having its cathode coupled, preferably connected, to the cathode of diode DZ51 and having its anode coupled, preferably connected, to reference node REFS.

Eventually, circuit 500 further comprises a capacitor C51 having a first electrode coupled, preferably connected, to output node OUT5 and having a second electrode coupled, preferably connected, to reference node REFS.

Figure 6:
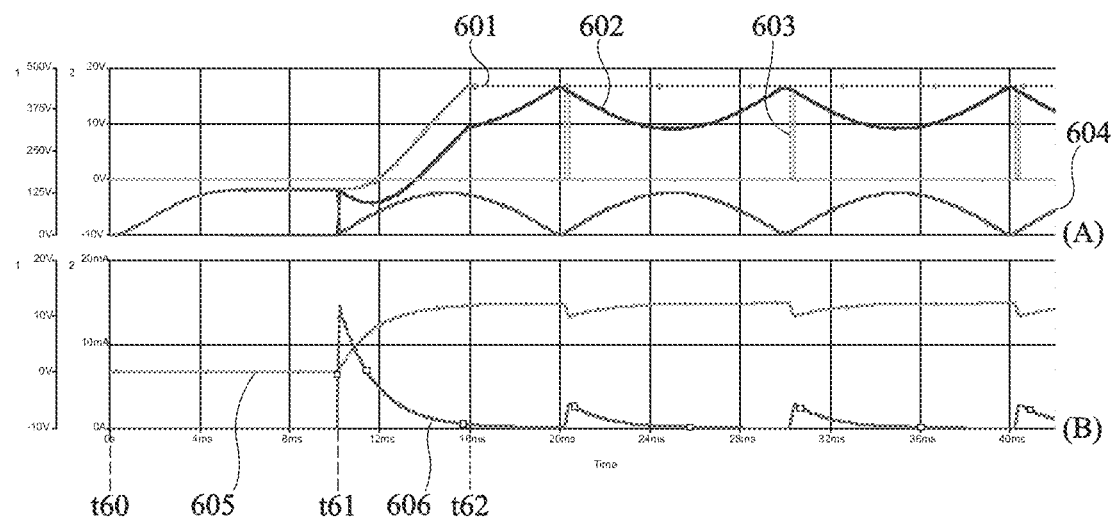
FIG. 6 shows two sets of curves illustrating the operation of the converter of FIG. 2 when it comprises the circuit of FIG. 5 according to a first example.

FIG. 6 comprises two graphs (A) and (B) enabling to illustrate the operation of a converter 200 described in relation with FIG. 2 comprising a circuit 500 described in relation with FIG. 5 where internal voltage VINT2 corresponds to the voltage taken between nodes N4 and GND of converter 200.

Graphs (A) and (B) comprise curves illustrating the time variation of voltages and current of converter 200, among which: a curve 601 showing the variation of the voltage between nodes N4 and GND, called voltage VBUS, in FIG. 6 the curve forms part of graph (A); a curve 602 showing the time variation of the voltage between nodes N4 and N2, called voltage VBUS-VCf3, in FIG. 6 the curve forms part of graph (A); a curve 603 showing the time variation of the common control voltage supplied by control circuits CMD1 and CMD2 to the gates of thyristors T1 and T2, called voltage VT12, in FIG. 6 the curve forms part of graph (A); a curve 604 showing the time variation of the voltage across capacitor Cf3, that is, the voltage between nodes N2 and GND, in FIG. 6 the curve forms part of graph (A); a curve 605 showing the time variation of the power supply voltage VCC_CMD supplied by circuit 500, that is, the voltage between nodes OUT5 and N2, in FIG. 6 the curve forms part of graph (B); and a curve 606 showing the time variation of the current IT51 flowing through the transistor T51 of circuit 500, by convention current IT51 is considered as positive when the current flows from the collector to the emitter of transistor T51, in FIG. 6 the curve forms part of graph (B).

Before an initial time t60, converter 200 receives no voltage VAC to be converted. The voltages and current having their variation shown by curves 601 to 606 are in a quiescent state. More particularly, the voltages of curves 601 to 605 all have an amplitude close to 0 V, or even less than 0 V, and the current of curve 606 has an amplitude in the order of 0 A.

From initial time t60, and until a time t61, subsequent to time t60, converter 200 starts receiving an ac voltage VAC to be converted and starts. During this phase, capacitors Cf3 and C_BUS are charged by using the ac voltage VAC to be converted applied through resistor R1, diodes D1, D2, D3, and D4. Thus, at time t61, the voltage of curve 604 has increased up to a first stage.

At time t61, the power factor correction circuit is started, transistor M1 is turned on by its control voltage VG1. The voltage VBUS of curve 601 increases. The voltage across capacitor Cf3 then becomes periodic and features an alternating current (see curve 604).

At a time t62, subsequent to time t61, voltage VBUS (curve 601) reaches a stage sufficiently high to supply circuit 500, which then delivers a voltage VCC_CMD (see curve 605) sufficiently high for the common control voltage of curve 603 to be able to control thyristors T1 and T2.

Figure 7:
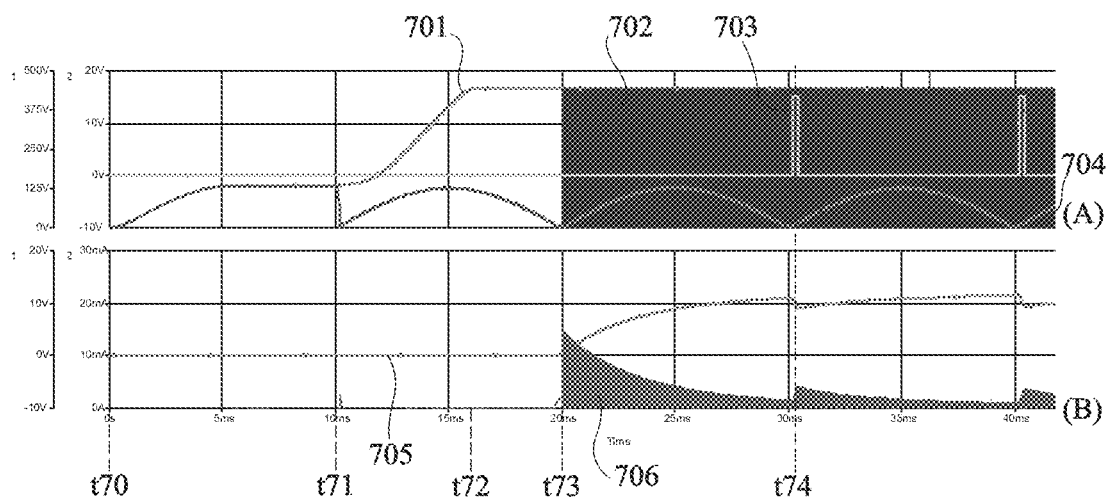
FIG. 7 shows two sets of curves illustrating the operation of the converter of FIG. 2 when it comprises the circuit of FIG. 5 according to a second example.

FIG. 7 comprises two graphs (A) and (B) enabling to illustrate the operation of a converter 200 described in relation with FIG. 2 comprising a circuit 500 described in relation with FIG. 5 where internal voltage VINT2 corresponds to the voltage taken between nodes N5 and GND of converter 200.

Graphs (A) and (B) comprise curves illustrating the time variation of voltages and current of converter 200, among which: a curve 701 showing the variation of the voltage between nodes N4 and GND, called voltage VBUS, in FIG. 7 the curve forms part of graph (A); a curve 702 showing the time variation of the voltage between nodes N5 and GND, called voltage VMP, in FIG. 7 the curve forms part of graph (A); a curve 703 showing the time variation of the common control voltage supplied by control circuits CMD1 and CMD2 to the gates of thyristors T1 and T2, called voltage VT12, in FIG. 7 the curve forms part of graph (A); a curve 704 showing the time variation of the voltage across capacitor Cf3, that is, the voltage between nodes N2 and GND, in FIG. 7 the curve forms part of graph (A); a curve 705 showing the time variation of the power supply voltage VCC_CMD supplied by circuit 500, that is, the voltage between nodes OUT5 and N2, in FIG. 7 the curve forms part of graph (B); and a curve 706 showing the time variation of the current IT51 flowing through transistor T51 of circuit 500, by convention current IT51 is considered as positive when the current flows from the collector to the emitter of transistor T51, in FIG. 7 the curve forms part of graph (B).

The operation of a converter 200 using the voltage taken between nodes N5 and N2 to supply circuit 500 is similar to the operation described in relation with FIG. 6.

Before an initial time t70, converter 200 receives no voltage VAC to be converted. The voltages and current having their variation shown by curves 701 to 706 are in a quiescent state. More particularly, the voltages of curves 701 to 705 all have an amplitude close to 0 V, or even less than 0 V, and the current of curve 706 has an amplitude in the order of 0 A.

From initial time t70, and until a time t71, subsequent to time t70, converter 200 starts receiving an ac voltage VAC to be converted and starts. During this phase, capacitors Cf3 and C_BUS are charged by using the ac voltage VAC to be converted flowing through resistor R1, and diodes D1, D2, D3, and D4. Thus, at time t71, the voltage of curve 704 has increased.

At time t71, the power factor correction circuit is started, transistor M1 is turned on by its control voltage VG1. The voltage VBUS of curve 701 increases until a time t72, subsequent to time t71. The voltage across capacitor Cf3 then becomes periodic (see curve 704).

At a time t73, subsequent to time t72, or according to an alternative embodiment directly at time t72, transistors M2 and M3 are turned on by their control voltages VG2 and VG3. The voltage VMP of curve 702 increases and becomes periodic.

At time t74, subsequent to time t73, voltage VMP is sufficiently high to supply circuit 500 which then supplies a voltage VCC_CMD (see curve 705) sufficiently high for the common control voltage of curve 703 to be able to control thyristors T1 and T2, which then exhibits a first peak or a first control pulse.

Figure 8:
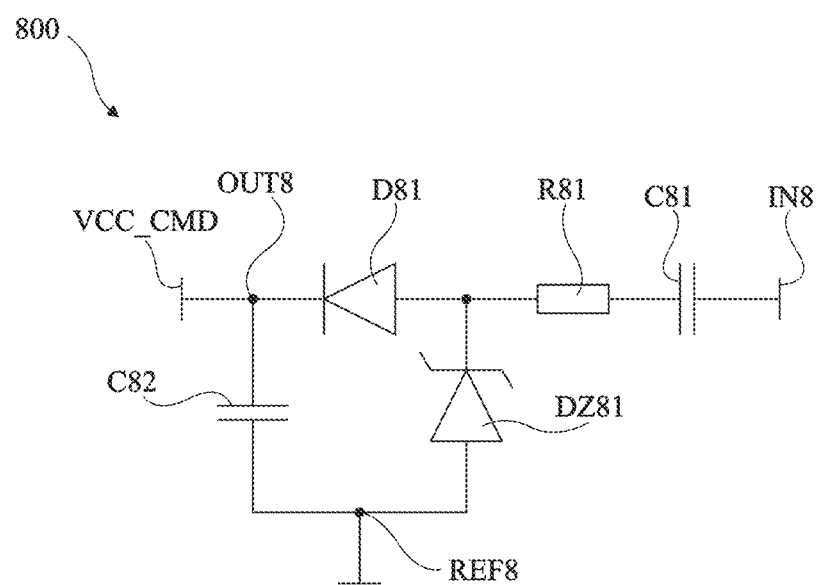
FIG. 8 shows an electric diagram of a second example of embodiment of another circuit configured to convert a voltage forming part of the converter of FIG. 1 or of FIG. 2.

FIG. 8 is an electric diagram of a second example of embodiment of a circuit 800 configured to convert an internal voltage of a converter into a power supply voltage. Circuit 800 is an example of a circuit capable of being used as a circuit 203 in a converter of the type of the converter 200 described in relation with FIG. 2.

Like the circuit 203 described in relation with FIG. 2, circuit 800 receives, between an input node IN8 and a reference node REF8, internal voltage VINT2, and supplies, between an output node OUT8 and a reference node REF8, dc power supply voltage VCC_CMD configured to power the circuit(s) for controlling the thyristors T1 and T2 of converter 200. Reference node REF8 is coupled, preferably connected, to node N2 of converter 200.

Further, as previously described, internal voltage VINT2 is a voltage taken at the level of the first converting stage 201 or of the second stage 202 of the converter 200 of FIG. 2, at a node coupled to the output of inductance L1. The operation of the case where voltage VINT2 is taken at the level of node N4 is described in relation with FIG. 9, and the operation of the case where voltage VINT2 is taken at the level of node N5 is described in relation with FIG. 10.

Circuit 800 is a capacitive power supply circuit comprising a first branch comprising, in series between nodes IN8 and OUT8, a capacitor C81, a resistor R81, and a diode D81. More particularly, a first electrode of capacitor C81 is coupled, preferably connected, to node IN8, and a second electrode of capacitor C81 is coupled, preferably connected, to a first terminal of resistor R81. A second terminal of resistor R81 is coupled, preferably connected, to the anode of diode D81. The cathode of diode D81 is coupled, preferably connected, to node OUT8.

Circuit 800 further comprises a Zener diode DZ81 having its cathode coupled, preferably connected, to the anode of diode D81, and having its anode coupled, preferably connected, to reference node REF8.

Eventually, circuit 500 further comprises a capacitor C82 having a first electrode coupled, preferably connected, to output node OUT8 and having a second electrode coupled, preferably connected, to reference node REF8.

Figure 9:
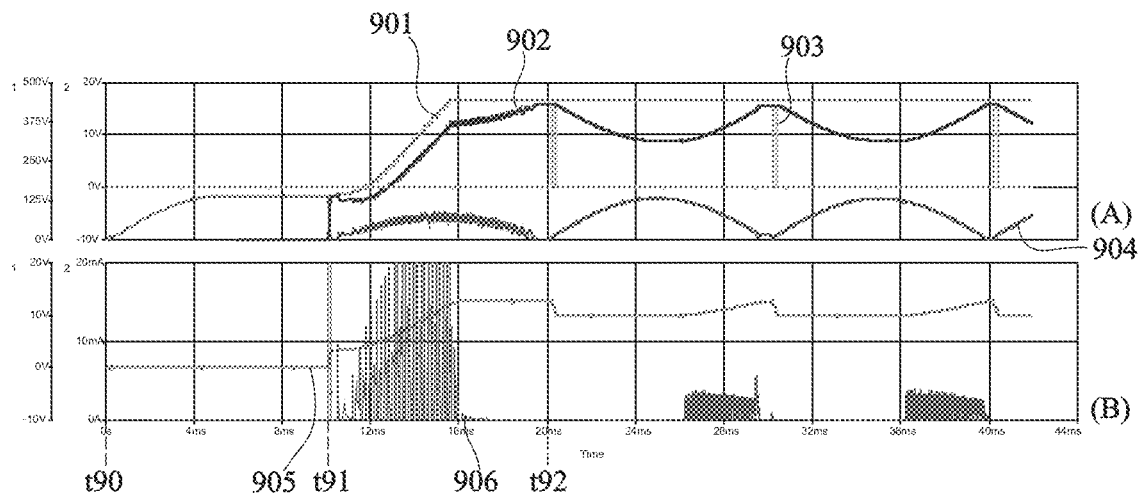
FIG. 9 shows two sets of curves illustrating the operation of the converter of FIG. 2 when it comprises the circuit of FIG. 8 according to a first example.

FIG. 9 comprises two graphs (A) and (B) enabling to illustrate the operation of a converter 200 described in relation with FIG. 2 comprising a circuit 800 described in relation with FIG. 8 where internal voltage VINT2 corresponds to the voltage taken between nodes N4 and GND of converter 200.

Graphs (A) and (B) comprise curves illustrating the time variation of voltages and current of converter 200, among which: a curve 901 showing the time variation of the voltage between nodes N4 and GND, called voltage VBUS, in FIG. 9 the curve forms part of graph (A); a curve 902 showing the time variation of the voltage across capacitor C81, called voltage VC81, in FIG. 9 the curve forms part of graph (A); a curve 903 showing the time variation of the common control voltage supplied by control circuits CMD1 and CMD2 to the gates of thyristors T1 and T2, called voltage VT12, in FIG. 9 the curve forms part of graph (A); a curve 904 showing the time variation of the voltage across capacitor Cf3, that is, the voltage between nodes N2 and GND, in FIG. 9 the curve forms part of graph (A); a curve 905 showing the time variation of the power supply voltage VCC_CMD supplied by circuit 800, that is, the voltage between nodes OUT8 and N2, in FIG. 9 the curve forms part of graph (B); and a curve 906 showing the time variation of the current ID81 flowing through the diode D81 of circuit 800, by convention current ID81 is considered as positive when the current flows from the anode to the cathode of diode D81, in FIG. 9 the curve forms part of graph (B).

Before an initial time t90, converter 200 receives no voltage VAC to be converted. The voltages and current having their variation shown by curves 901 to 906 are in a quiescent state. More particularly, the voltages of curves 901 to 905 all have an amplitude close to 0 V, or even less than 0 V, and the current of curve 906 has an amplitude in the order of 0 A.

From initial time t90, and until a time t91, subsequent to time t90, converter 200 starts receiving an ac voltage VAC to be converted and starts. During this phase, capacitors Cf3 and C_BUS are charged by using the ac voltage VAC to be converted through diodes D1 and D2. Thus, at time t91, the voltage of curve 904 has increased.

At time t91, the power factor correction circuit is started, transistor M1 is turned on by its control voltage VG1. The voltage VBUS of curve 901 increases. The voltage across capacitor Cf3 then becomes periodic (see curve 904).

Further, at time t91, the capacitor C82 of circuit 800 starts charging by using the current flowing through the capacitor C81 of circuit 800.

At a time t92, subsequent to time t91, voltage VBUS is sufficiently high to supply circuit 800, which then delivers a voltage VCC_CMD (see curve 905) sufficiently high for the common control voltage of curve 903 to be able to control thyristors T1 and T2.

Figure 10:
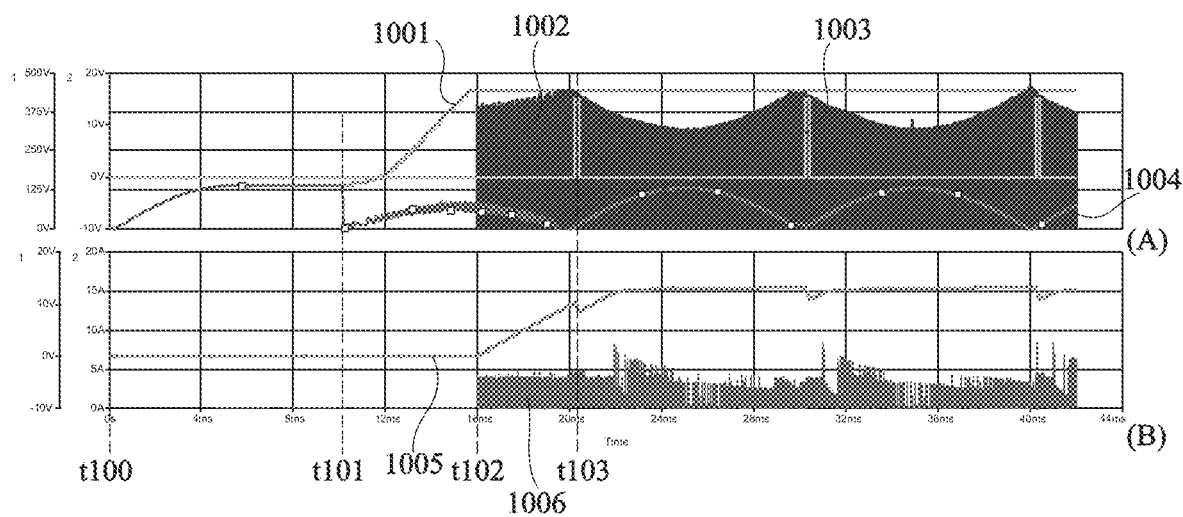
FIG. 10 shows two sets of curves illustrating the operation of the converter of FIG. 2 when it comprises the circuit of FIG. 8 according to a second example.

FIG. 10 comprises two graphs (A) and (B) enabling to illustrate the operation of a converter 200 described in relation with FIG. 2 comprising a circuit 800 described in relation with FIG. 8 where internal voltage VINT2 corresponds to the voltage taken between nodes N5 and GND of converter 200.

Graphs (A) and (B) comprise curves illustrating the time variation of voltages and current of converter 200, among which: a curve 1001 showing the time variation of the voltage between nodes N4 and GND, called voltage VBUS, in FIG. 10 the curve forms part of graph (A); a curve 1002 showing the time variation of the voltage across capacitor C81, called voltage VC81, in FIG. 10 the curve forms part of graph (A); a curve 1003 showing the time variation of the common control voltage supplied by control circuits CMD1 and CMD2 to the gates of thyristors t1 and T2, called voltage VT12, in FIG. 10 the curve forms part of graph (A); a curve 1004 showing the time variation of the voltage across capacitor Cf3, that is, the voltage between nodes N2 and GND, in FIG. 10 the curve forms part of graph (A); a curve 1005 showing the time variation of the power supply voltage VCC_CMD delivered by circuit 800, that is, the voltage between nodes OUT8 and N2, in FIG. 10 the curve forms part of graph (B); and a curve 1006 showing the time variation of the current ID81 flowing through the diode D81 of circuit 800, by convention current ID81 is considered as positive when the current flows from the anode to the cathode of diode D81, in FIG. 10 the curve forms part of graph (B).

Before an initial time t100, converter 200 receives no voltage VAC to be converted. The voltages and current having their variation shown by curves 1001 to 1006 are in a quiescent state. More particularly, the voltages of curves 1001 to 1005 all have an amplitude close to 0 V, or even less than 0 V, and the current of curve 1006 has an amplitude in the order of 0 A.

From initial time t100, and until a time t101, subsequent to time t100, converter 200 starts receiving an ac voltage VAC to be converted and starts. During this phase, capacitors Cf3 and C_BUS are charged by using the ac voltage VAC to be converted applied across resistor R1, and diodes D1, D2, D3, and D4. Thus, at time t101, the voltage of curve 1004 has increased.

At time t101, the power factor correction circuit is started, transistor M1 is turned on by its control voltage VG1. The voltage VBUS of curve 1001 increases until a time t102, subsequent to time 101. The voltage across capacitor Cf3 then becomes periodic (see curve 1004).

At time t102 or, according to a variant at a time t73, subsequent to time t72, transistors M2 and M3 are turned on by their control voltages VG2 and VG3. The capacitor C82 of circuit 800 starts charging by using the current flowing through the capacitor C81 of circuit 800.

At a time t103, subsequent to time t101, voltage VBUS is sufficiently high to supply circuit 800, which then supplies a voltage VCC_CMD (see curve 1005) sufficiently high for the common control voltage of curve 1003 to be able to control thyristors T1 and T2.

Figure 11:
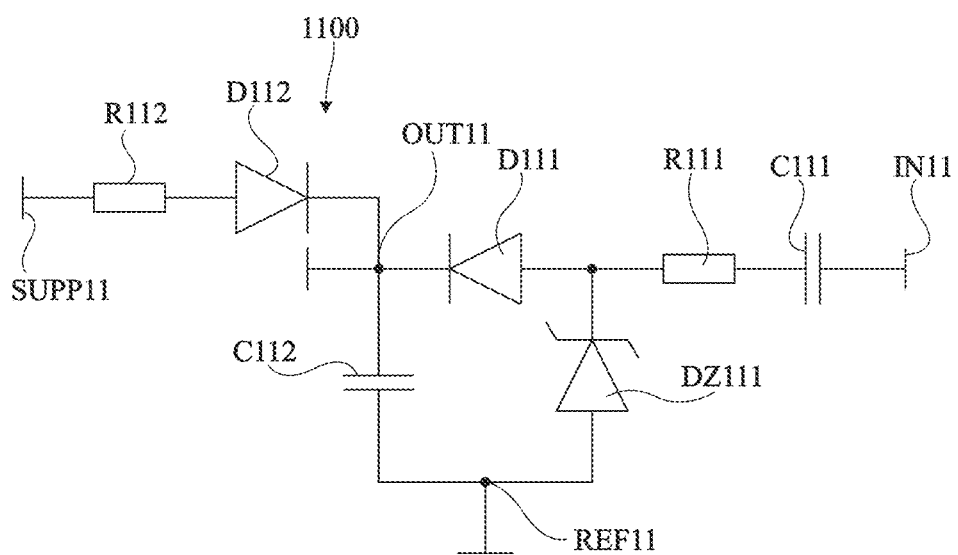
FIG. 11 shows an electric diagram of a third example of embodiment of another circuit configured to convert a voltage forming part of the converter of FIG. 1 or of FIG. 2.

FIG. 11 is an electric diagram of a second example of embodiment of a circuit 1100 configured to convert an internal voltage of a converter into a power supply voltage. Circuit 1100 is an example of a circuit capable of being used as a circuit 203 in a converter of the type of the converter 200 described in relation with FIG. 2.

Like the circuit 203 described in relation with FIG. 2, circuit 1100 receives on an input node IN11 internal voltage VINT2, and supplies on an output node OUT11 dc power supply voltage VCC_CMD configured to power the circuit(s) for controlling the thyristors T1 and T2 of converter 200. Circuit 500 further comprises a reference node REF11 coupled, preferably connected, to node N2 of converter 200.

Further, as previously described, internal voltage VINT2 is a voltage taken at the level of first converting state 201 of the converter 200 of FIG. 2. According to an example, voltage VINT2 may be taken at the level of node N3, N4, or N5, being referenced to the reference node GND of converter 200. The operation of the case where voltage VINT2 is taken at the level of node N4 is described in relation with FIG. 12, and the operation of the case where voltage VINT2 is taken at the level of node N3 is described in relation with FIG. 13.

Circuit 1100 is a capacitive power supply circuit comprising a first branch comprising, in series between nodes IN11 and OUT11, a capacitor C111, a resistor R111, and a diode D111. More particularly, a first electrode of capacitor C111 is coupled, preferably connected, to node IN11, and a second electrode of capacitor C11 is coupled, preferably connected, to a first terminal of resistor R111. A second terminal of resistor R111 is coupled, preferably connected, to the anode of diode D111. The cathode of diode D111 is coupled, preferably connected, to node OUT11.

Circuit 1100 further comprises a Zener diode DZ111 having its cathode coupled, preferably connected, to the anode of diode D111 and having its anode coupled, preferably connected, to reference node REF11.

Eventually, circuit 500 further comprises a capacitor C112 having a first electrode coupled, preferably connected, to output node OUT11 and having a second electrode coupled, preferably connected, to reference node REF11.

Circuit 1100 further comprises a second branch or precharge circuit comprising, in series between a node SUPP11 and node OUT11, a resistor R112 and a diode D112. More particularly, a first terminal of transistor R112 is coupled, preferably connected, to node SUPP11, and a second terminal of resistor R112 is coupled, preferably connected, to the cathode of diode D112. The anode of diode D112 is coupled, preferably connected, to node OUT11. Node SUPP11 receives the dc power supply potential VCC of converter 200. The second branch enables to accelerate the starting of circuit 1100 with respect to circuit 800.

Figure 12:
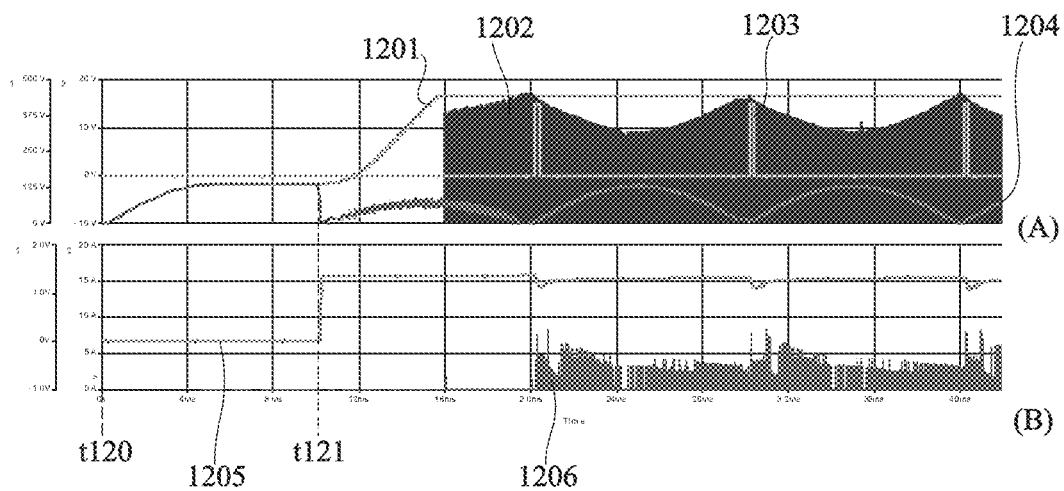
FIG. 12 shows two sets of curves illustrating the operation of the converter of FIG. 2 when it comprises the circuit of FIG. 11 according to a first example.

FIG. 12 comprises two graphs (A) and (B) enabling to illustrate the operation of a converter 200 described in relation with FIG. 2 comprising a circuit 1100 described in relation with FIG. 8 where internal voltage VINT2 corresponds to the voltage taken between nodes N4 and GND of converter 200.

Graphs (A) and (B) comprise curves illustrating the variation of the voltages and current of converter 200, among which: a curve 1201 showing the time variation of the voltage between nodes N4 and GND, called voltage VBUS, in FIG. 12 the curve forms part of graph (A); a curve 1202 showing the time variation of the voltage across capacitor C111, called voltage VC111, in FIG. 12 the curve forms part of graph (A); a curve 1203 showing the time variation of the common control voltage supplied by control circuits CMD1 and CMD2 to the gates of thyristors T1 and T2, called voltage VT12, in FIG. 12 the curve forms part of graph (A); a curve 1204 showing the time variation of the voltage across capacitor Cf3, that is, the voltage between nodes N2 and GND, in FIG. 12 the curve forms part of graph (A); a curve 1205 showing the time variation of the power supply voltage VCC_CMD supplied by circuit 1100, that is, the voltage between nodes OUT11 and N2, in FIG. 12 the curve forms part of graph (B); and a curve 1206 showing the time variation of the current ID111 flowing through the diode D111 of circuit 1110, by convention current ID111 is considered as positive when the current flows from the anode to the cathode of diode D111, in FIG. 12 the curve forms part of graph (B).

Before an initial time t120, converter 200 receives no voltage VAC to be converted. The voltages and current having their variation shown by curves 1201 to 1206 are in a quiescent state. More particularly, the voltages of curves 1201 to 1205 all have an amplitude close to 0 V, or even less than 0 V, and the current of curve 1206 has an amplitude in the order of 0 A.

From initial time t120, and until a time t121, subsequent to time t120, converter 200 starts receiving an ac voltage VAC to be converted and starts. During this phase, capacitors Cf3 and C_BUS are charged by using the ac voltage VAC to be converted applied across resistor R1, and diodes D1, D2, D3, and D4. Thus, at time t121, the voltage of curve 1204 has increased.

Between times t120 and t121, the circuit delivering power supply voltage VCC is activated and supplies to node SUPP11 a voltage, referenced to the reference node GND of the converter circuit, having an amplitude in the range from 3 to 18 V.

At time t121, the power factor correction circuit is started, transistor M1 is turned on by its control voltage VG1. The voltage VBUS of curve 1201 increases. The voltage across capacitor Cf3 then becomes periodic (see curve 1204).

Further, at time t121, the capacitor C112 of circuit 1200 starts charging by using the current supplied on node SUPP11, by power supply voltage VCC, through resistor R112 and diode D112. Moreover, power supply voltage VCC may further supply a current flowing through transistor M1 when it is in the on state.

From time t121, voltage VCC_CMD (see curve 1205) is sufficiently high for the common control voltage of curve 1203 to be able to control thyristors T1 and T2. The two thyristors T1 and T1 can then be controlled but in practice, it may be preferable to wait for the activation of transistors M2 and M3 to be able to charge capacitor C112 with the current supplied by capacitor C111 when converting stage 202 is activated, and an ac voltage of relatively high frequency is supplied between nodes N5 and GND. High frequency will here designate an ac voltage having a frequency greater than a few kHz, in practice from 10 to 100 kHz. In this embodiment identical to the embodiment described in relation with FIG. 10, voltage VINT2 is a high-frequency voltage.

An advantage of circuit 1100, as compared with circuit 800, is that is enables to accelerate the converter 200 start-up.

Figure 13:
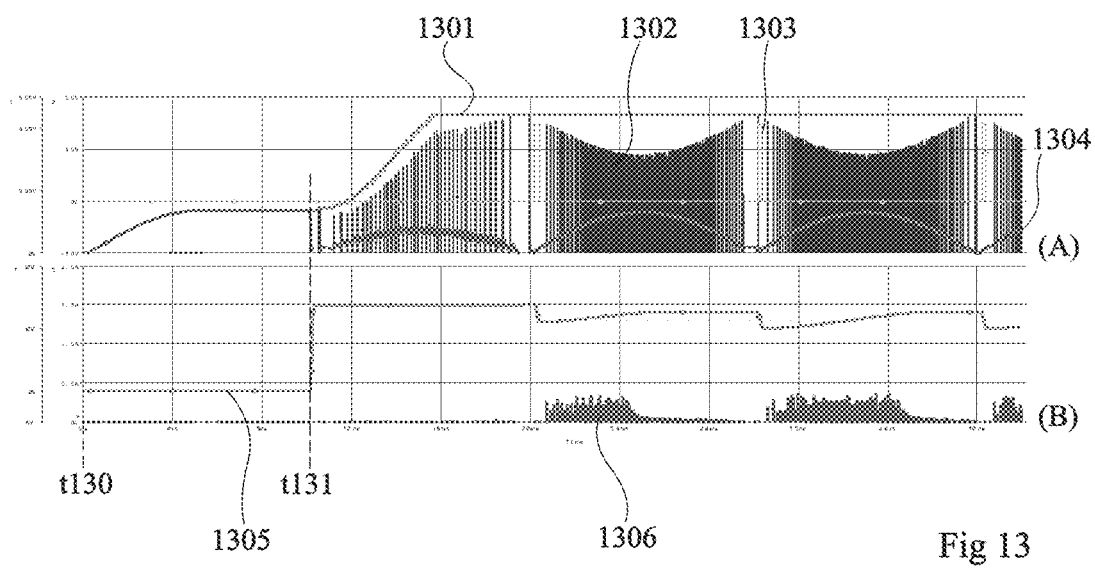
FIG. 13 shows two sets of curves illustrating the operation of the converter of FIG. 2 when it comprises the circuit of FIG. 11 according to a second example.

FIG. 13 comprises two graphs (A) and (B) enabling to illustrate the operation of a converter 200 described in relation with FIG. 2 comprising a circuit 1100 described in relation with FIG. 11 where internal voltage VINT2 corresponds to the voltage taken between nodes N3 and GND of converter 200.

Graphs (A) and (B) comprise curves illustrating the time variation of voltages and current of converter 200, among which: a curve 1301 showing the time variation of the voltage between nodes N4 and GND, called voltage VBUS, in FIG. 13 the curve forms part of graph (A); a curve 1302 showing the time variation of the voltage across capacitor C111, called voltage VC111, in FIG. 13 the curve forms part of graph (A); a curve 1303 showing the time variation of the common control voltage supplied by control circuits CMD1 and CMD2 to the gates of thyristors T1 and T2, called voltage VT12, in FIG. 13 the curve forms part of graph (A); a curve 1304 showing the time variation of the voltage across capacitor Cf3, that is, of the voltage between nodes N2 and GND, in FIG. 13 the curve forms part of graph (A); a curve 1305 showing the time variation of the power supply voltage VCC_CMD supplied by circuit 1100, that is, the voltage between nodes OUT11 and N2, in FIG. 13 the curve forms part of graph (B); and a curve 1306 showing the time variation of the current ID111 flowing through the diode D111 of circuit 1100, by convention current ID111 is considered as positive when the current flows from the anode to the cathode of diode D111, in FIG. 13 the curve forms part of graph (B).

Before an initial time t130, converter 200 receives no voltage VAC to be converted. The voltages and current having their variation shown by curves 1301 to 1306 are in a quiescent state. More particularly, the voltages of curves 1301 to 1305 all have an amplitude close to 0 V, or even less than 0 V, and the current of curve 1306 has an amplitude in the order of 0 A.

From initial time t130, and until a time t131, subsequent to time t130, converter 200 starts receiving an ac voltage VAC to be converted and starts. During this phase, capacitors Cf3 and C_BUS are charged by using the ac voltage VAC to be converted applied across diodes D1 and D2. Thus, at time t131, the voltage of curve 1304 has increased.

At time t131, the power factor correction circuit is started, transistor M1 is turned on by its control voltage VG1. The voltage VBUS of curve 1301 increases. The voltage across capacitor Cf3 then becomes periodic (see curve 1304).

Further, at time t131, the capacitor C112 of circuit 1300 starts charging by using the current supplied by resistor R112 and diode D112.

From time t131, voltage VCC_CMD (see curve 1305) is sufficiently high for the common control voltage of curve 1303 to be able to control thyristors T1 and T2. The two thyristors T1 and T1 can then be controlled but in practice, it may be preferable to wait for the activation of transistors M2 and M3 to be able to charge capacitor C112 with the current supplied by capacitor C111 when converting stage 202 is activated, and an ac voltage of relatively high frequency is supplied between nodes N5 and GND. In this embodiment identical to the embodiment described in relation with FIG. 10, voltage VINT2 is a high-frequency voltage.

Figure 14:
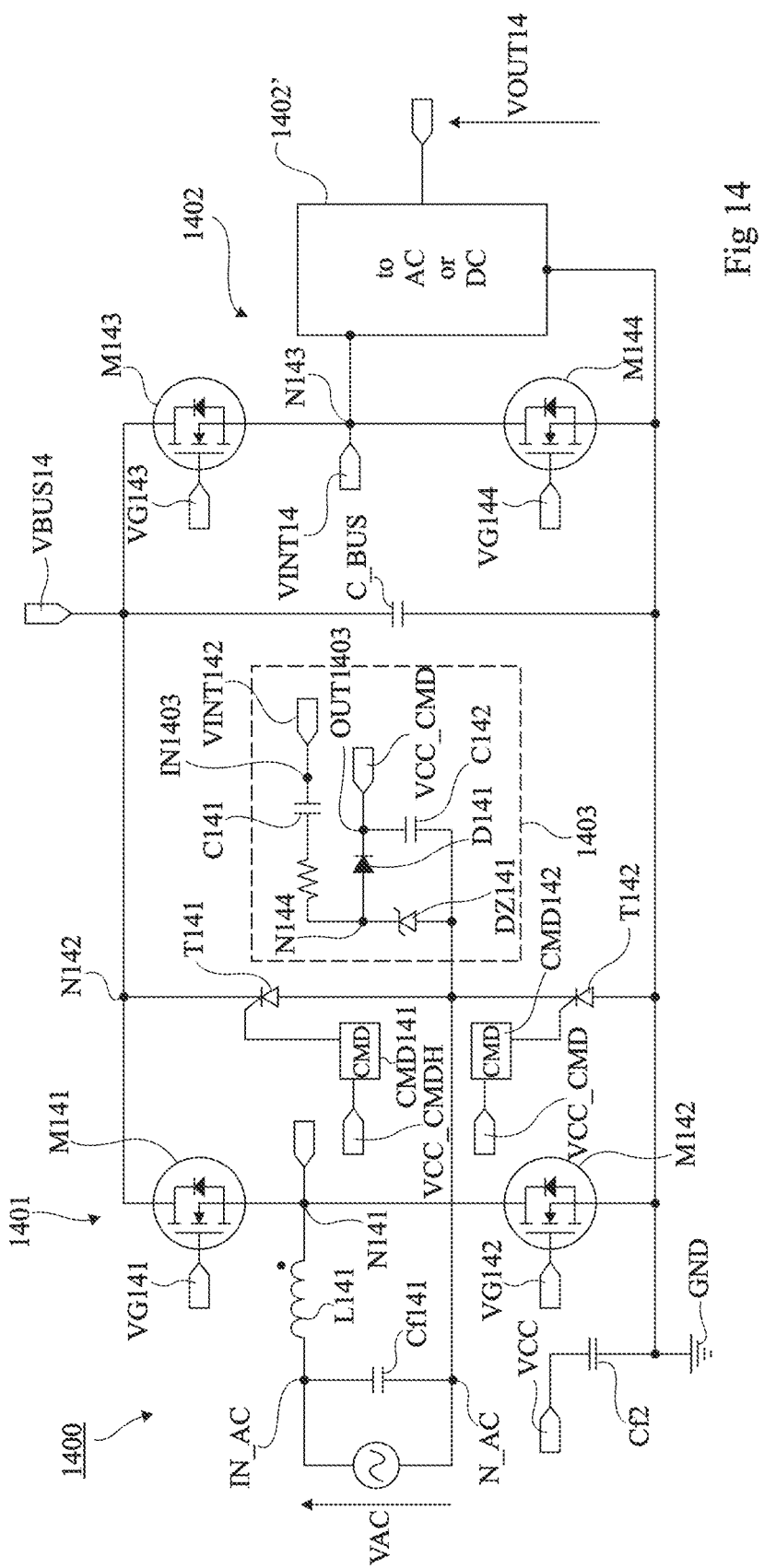
FIG. 14 shows an electric diagram, partially in the form of blocks, of a second embodiment of a voltage converter.

FIG. 14 is a second example of embodiment of a voltage converter 1400 of the type of the voltage converter 100 described in relation with FIG. 1. More particularly, FIG. 14 is an electric diagram, partially in the form of blocks, of voltage converter 1400.

Like the voltage converter 100 of FIG. 1, converter 1400 comprises: a first converting stage 1401; a second converting stage 1402, shown in the form of blocks; and a circuit 1403 configured to convert an internal voltage of first converting stage 1401 into a power supply voltage VCC_CMD.

As described in relation with FIG. 1, first converting stage 1401 receives ac input voltage VAC and outputs an intermediate voltage VBUS14. Second converting stage 1402 receives intermediate voltage VBUS14 and provides the output voltage VOUT14. Circuit 1403 receives an internal voltage VINT142 from converting stage 1401 to provide a power supply voltage VCC_CMD.

First converting stage 1401 comprises two input nodes IN_AC and N_AC receiving ac input voltage VAC.

Stage 1401 further comprises a power factor correction circuit comprising an inductance L141 and two N-type MOS transistors M141 and M142. A first terminal of inductance L141, or input terminal of inductance L141 is coupled, preferably connected, to node IN_AC and a second terminal of inductance L141, or output terminal of inductance L141, is coupled, preferably connected, to a node N141. The source of transistor M141 is coupled, preferably connected, to a node N141, and the drain of transistor M141 is coupled, preferably connected, to a node N142. The gate of transistor M2 receives a control potential VG141. The source of transistor M142 is coupled, preferably connected, to a node N141, and the drain of transistor M142 is coupled, preferably connected, to a node GND receiving a reference potential, for example, the ground. The gate of transistor M142 receives a control potential VG142.

Stage 1401 further comprises two thyristors T41 and T42 and their respective control circuits CMD141 (CMD) and CMD142 (CMD). Thyristor T141 has its cathode coupled, preferably connected, to a node N142, and its anode coupled, preferably connected, to node N_AC. The gate of thyristor T141 is coupled, preferably connected, to an output of control circuit CMD141. Control circuit CMD141 is powered with the voltage VCC_CMDH supplied by a circuit not shown in FIG. 14. Thyristor T142 has its cathode coupled, preferably connected, to a node N_AC, and its anode coupled, preferably connected, to node GND. The gate of thyristor T142 is coupled, preferably connected, to an output of control circuit CMD142. Control circuit CMD142 is powered with the voltage VCC_CMD supplied by circuit 1403. More detailed examples of control circuits CMD141 and CMD142 are described in relation with FIGS. 3 and 4.

First converting stage 201 further comprises a capacitor C_BUS placed between nodes N142 and GND, but also optionally comprises one or a plurality of filtering capacitors, among which: a capacitor Cf141 placed between nodes IN_AC and N_AC; and a capacitor Cf2 placed between node GND and a node receiving a dc power supply potential VCC from converter 1400.

The voltage across capacitor C_BUS is noted VBUS14 and corresponds to the intermediate voltage VINT described in relation with FIG. 1.

Second converting stage 1402 is of the type of the second converting stage 202 of the converter 200 described in relation with FIG. 2.

Second stage 1402 comprises a switching circuit comprising two transistors M143 and M144. Transistors M143 and M144 are N-type MOS transistors. The source of transistor M143 is coupled, preferably connected, to a node N143, and the drain du transistor M143 is coupled, preferably connected, to a node N142. The gate of transistor M143 receives a control potential VG143. The source of transistor M144 is coupled, preferably connected, to node GND and the drain of transistor M144 is coupled, preferably connected, to node N143. The gate of transistor M144 receives a control potential VG144.

The rest of second stage 1402 is shown in the form of a block 1402' (to AC or DC).

Circuit 1403 receives, on an input node IN1403, internal voltage VINT142 and supplies, on an output node OUT1403, voltage VCC_CMD. Circuit 1403 is further coupled, preferably connected, to the input node N_AC of converter 1400.

Circuit 1403 comprises, between input node IN1403 and node N_AC, a capacitor C141, a resistor R141, and a Zener diode DZ141. More particularly, a first electrode of capacitor C141 is coupled, preferably connected, to node IN1403 and a second electrode of capacitor C141 is coupled, preferably connected, to a first terminal of resistor R141. The second terminal of resistor R141 is coupled, preferably connected, to a node N144. The anode of diode DZ141 is coupled, preferably connected, to node N_AC and the cathode of diode DZ141 is coupled, preferably connected, to node N144.

Circuit 1403 further comprises a diode D141 between node OUT1403 and node N144. More particularly, the anode of diode D141 is coupled, preferably connected, to node N144 and the cathode of diode D141 is coupled, preferably connected, to output node OUT1403.

Circuit 1403 further comprises a capacitor C142 between node OUT1403 and node N_AC. More particularly, a first electrode of capacitor C142 is coupled, preferably connected, to node OUT1403 and a second electrode of capacitor C142 is coupled, preferably connected, to node N_AC.

Converter 1400 operates on the same principle as the converter 200 described in relation with FIG. 2. Circuit 1403 uses the ac component of internal voltage VINT142 to supply dc power supply voltage VCC_CMD to the circuits CM141 and CMD142 for controlling thyristors T141 and T142. In the case of converter 1400, internal voltage VINT142 may be the voltage between nodes N142 and GND or the voltage between nodes N143 and GND.

Figure 15:
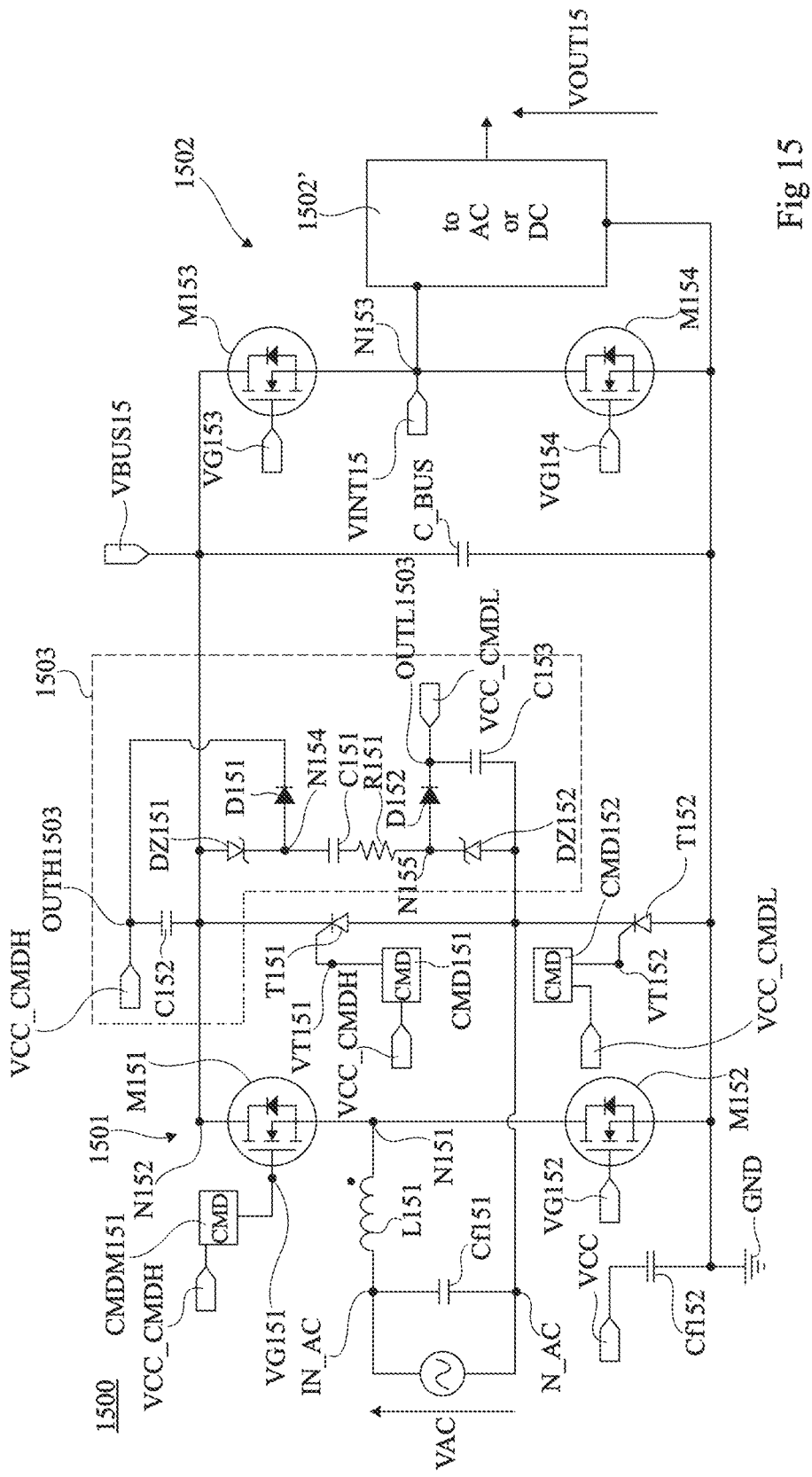
FIG. 15 shows an electric diagram, partially in the form of blocks, of a third embodiment of a voltage converter.

FIG. 15 is a third example of embodiment of a voltage converter 1500 of the type of the voltage converter 100 described in relation with FIG. 1. More particularly, FIG. 15 is an electric diagram, partially in the form of blocks, of voltage converter 1500.

Like the voltage converter 100 of FIG. 1, converter 1500 comprises: a first converting stage 1501; a second converting stage 1502, shown in the form of blocks; and a circuit 1503 configured to convert an internal voltage VINT15 of first converting stage 1501 into a power supply voltage.

As described in relation with FIG. 1, first converting stage 1501 receives ac input voltage VAC and outputs an intermediate voltage VBUS15. Second converting stage 1502 receives intermediate voltage VBUS15 and the reference potential of node GND and provides the output voltage VOUT15. Circuit 1503 receives another internal voltage VBUS15 of converting stage 1501 to provide two power supply voltages VCC_CMDL and VCC_CMDH.

First converting stage 1501 comprises two input nodes IN_AC and N_AC receiving ac input voltage VAC. Stage 1501 further comprises a power factor correction circuit comprising an inductance L151 and two N-type MOS transistors M151 and M152. A first terminal of inductance L151, or input terminal of inductance L151, is coupled, preferably connected, to node IN_AC, and a second terminal of inductance L151, or output terminal of inductance L151, is coupled, preferably connected, to a node N151. The source of transistor M151 is coupled, preferably connected, to a node N151, and the drain of transistor M151 is coupled, preferably connected, to a node N152. The gate of transistor M151 receives a control potential VG151. According to an example, control potential VG151 is supplied by a control circuit CMDM151 (CMD) receiving power supply voltage VCC_CMDH. The source of transistor M152 is coupled, preferably connected, to a node N151, and the drain of transistor M152 is coupled, preferably connected, to a node GND receiving a reference potential, for example, the ground. The gate of transistor M152 receives a control potential VG152.

Stage 1501 further comprises two thyristors T151 and T152 and their respective control circuits CMD151 (CMD) and CMD152 (CMD). Thyristor T151 has its cathode coupled, preferably connected, to a node N152, and its anode coupled, preferably connected, to node N_AC. The gate of thyristor T151 is coupled, preferably connected, to an output of control circuit CMD151. Control circuit CMD151 is powered with the voltage VCC_CMDH supplied by circuit 1503. Thyristor T152 has its cathode coupled, preferably connected, to a node N_AC, and its anode coupled, preferably connected, to node GND. The gate of thyristor T152 is coupled, preferably connected, to an output of control circuit CMD152. Control circuit CMD152 is powered with the voltage VCC_CMDL delivered by circuit 1503. More detailed examples of control circuits CMD151 and CMD152 are described in relation with FIGS. 3 and 4.

First converting stage 1501 further comprises a capacitor C_BUS placed between nodes N152 and GND, but also optionally comprises one or a plurality of filtering capacitors, among which: a capacitor Cf151 placed between nodes IN_AC and N_AC; and a capacitor Cf152 placed between node GND and a node receiving a dc power supply potential VCC from converter 1500.

The voltage across capacitor C_BUS is noted VBUS15 and corresponds to the intermediate voltage VINT described in relation with FIG. 1.

Second converting stage 1502 is of the type of the second converting stage 202 of the converter 200 described in relation with FIG. 2.

This second stage further comprises a switching circuit comprising two transistors M153 and M154. Transistors M153 and M154 are N-channel MOS transistors. The source of transistor M153 is coupled, preferably connected, to a node N153 and the drain of transistor M153 is coupled, preferably connected, to node N152. The gate of transistor M153 receives a ground potential VG153. The source of transistor M154 is coupled, preferably connected, to node GND and the drain of transistor M154 is coupled, preferably connected, to node N153. The gate of transistor M154 receives a control potential VG154.

The rest of second stage 1502 is shown by a block 1502' (to AC or DC).

Circuit 1503 comprises an input node coupled, preferably connected, to node N152 of converter 1500 and outputs, on a first output node OUTH153, power supply voltage VCC_CMDH and, on a second output node OUTL1503, power supply voltage VCC_CMDL. Circuit 1503 is further coupled, preferably connected, to the input node N_AC of converter 1500.

Circuit 1503 comprises, between node N152 and node N_AC, a Zener diode DZ151, a capacitor C151, a resistor R151, and a Zener diode DZ152. More particularly, the anode of Zener diode DZ151 is coupled, preferably connected, to node N152 and the cathode of diode DZ151 is coupled, preferably connected, to a node N154. A first electrode of capacitor C151 is coupled, preferably connected, to node N154 and a second electrode of capacitor C152 is coupled, preferably connected, to a first terminal of resistor R151. A second terminal of resistor R151 is coupled, preferably connected, to a node N155. The cathode of diode DZ152 is coupled, preferably connected, to node N155 and the anode of diode DZ152 is coupled, preferably connected, to node N_AC.

Converter 150 further comprises a capacitor C152 and a diode D151. More particularly, a first electrode of capacitor C152 is coupled, preferably connected, to node OUTH153, and a second electrode of capacitor C152 is coupled, preferably connected, to node N152. The cathode of diode D151 is coupled, preferably connected, to node OUTH1503 and the anode of diode D151 is coupled, preferably connected, to a node N154.

Converter 1500 further comprises a capacitor C153 and a diode D152. More particularly, a first electrode of capacitor C153 is coupled, preferably connected, to node OUTL153 and a second electrode of capacitor C153 is coupled, preferably connected, to node N_AC. The cathode of diode D152 is coupled, preferably connected, to node OUTL1503 and the anode of diode D152 is coupled, preferably connected, to a node N_AC.

Figure 16:
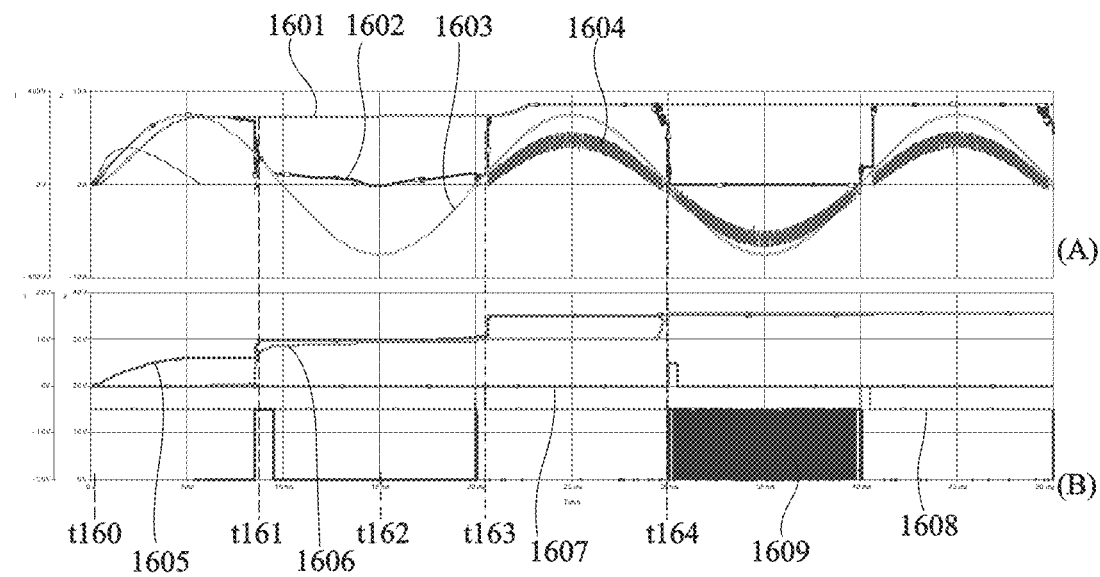
FIG. 16 shows two sets of curves illustrating a first operating mode of the converter of FIG. 15.
Figure 17:
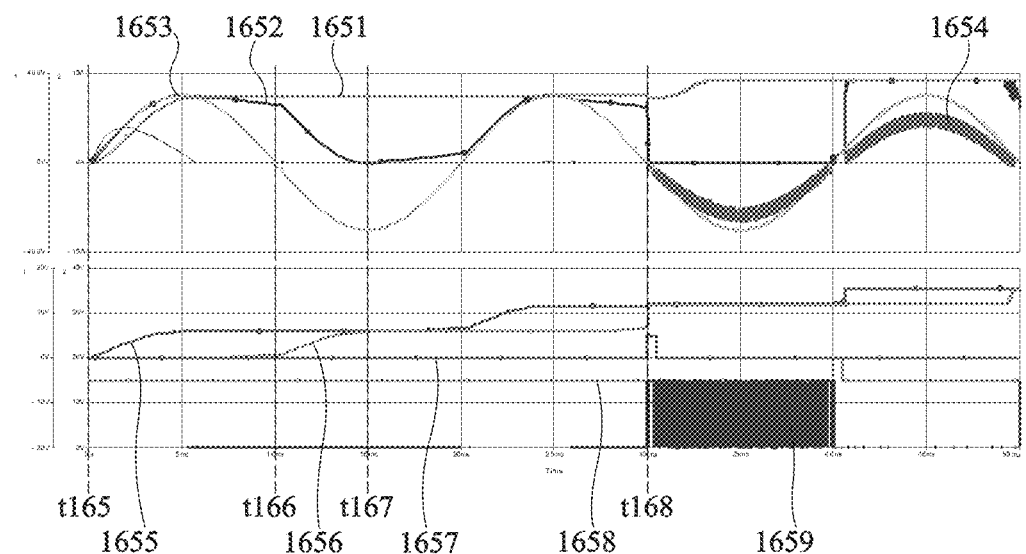
FIG. 17 shows two sets of curves illustrating a second operating mode of the converter of FIG. 15.

Two operating modes of converter 1500 are described in relation with FIGS. 16 and 17.

FIG. 16 comprises two graphs (A) and (B) enabling to illustrate a first operating mode of the converter 1500 described in relation with FIG. 15.

Graphs (A) and (B) comprise curves illustrating the time variation of voltages and current of converter 1500, among which: a curve 1601 showing the time variation of the voltage between nodes N152 and GND, called voltage VBUS15, in FIG. 16 the curve forms part of graph (A); a curve 1602 showing the time variation of the voltage between nodes N152 and N_AC, in FIG. 16 the curve forms part of graph (A); a curve 1603 showing the time variation of the ac input voltage VAC applied between nodes IN_AC and N_AC, in FIG. 16 the curve forms part of graph (A); a curve 1604 showing the time variation of the current flowing through inductance L151, in FIG. 16 the curve forms part of graph (A); a curve 1605 showing the time variation of the power supply voltage VCC_CMDL supplied by circuit 1503, that is, the voltage between nodes OUTL1403 and N_AC, in FIG. 16 the curve forms part of graph (B); a curve 1606 showing the time variation of the power supply voltage VCC_CMDH supplied by circuit 1503, that is, the voltage between nodes OUTH403 and N152, in FIG. 16 the curve forms part of graph (B); a curve 1607 showing the time variation of the control voltage VT151 supplied to thyristor T151 by control circuit CMD151, in FIG. 16 the curve forms part of graph (B); a curve 1608 showing the time variation of the control voltage VT152 supplied to thyristor T152 by control circuit CMD152, in FIG. 16 the curve forms part of graph (B); and a curve 1609 showing the time variation of the voltage between the gate and the source of transistor M151, that is, the voltage between nodes VG151 and N151, in FIG. 17 the curve forms part of graph (B).

Before an initial time t160, converter 200 receives no ac voltage VAC to be converted. The voltages and current having their variation shown by curves 1601 and 1602 and 1604 to 1609 are in a quiescent state. More particularly, the voltages of curves 1601, 1602, 1606 to 1608 all have an amplitude close to 0 V, or even lower than 0 V, and the current of curve 1604 has an amplitude in the order of 0 A.

From initial time t160, and until a time t161, subsequent to time t160, converter 1500 starts receiving the ac voltage VAC to be converted and starts. During this phase, and according to an example, the amplitude of voltage AC is positive and exhibits a rising edge, capacitor C153 is charged by using the voltage between nodes N152 and N_AC (curve 1602), which increases at the same time as ac voltage VAC. Further, at time t161, transistor M151 is intentionally turned on for a short time (while the power factor correction circuit will only actually start at a subsequent time t163), by signal VG151, and the power factor correction circuit is started. The voltage between potentials VBUS15 and N_AC (curve 1602) exhibits a falling edge and slightly oscillates. At time t161, the voltage VBUS151 of curve 1601 has increased.

Figure 18:
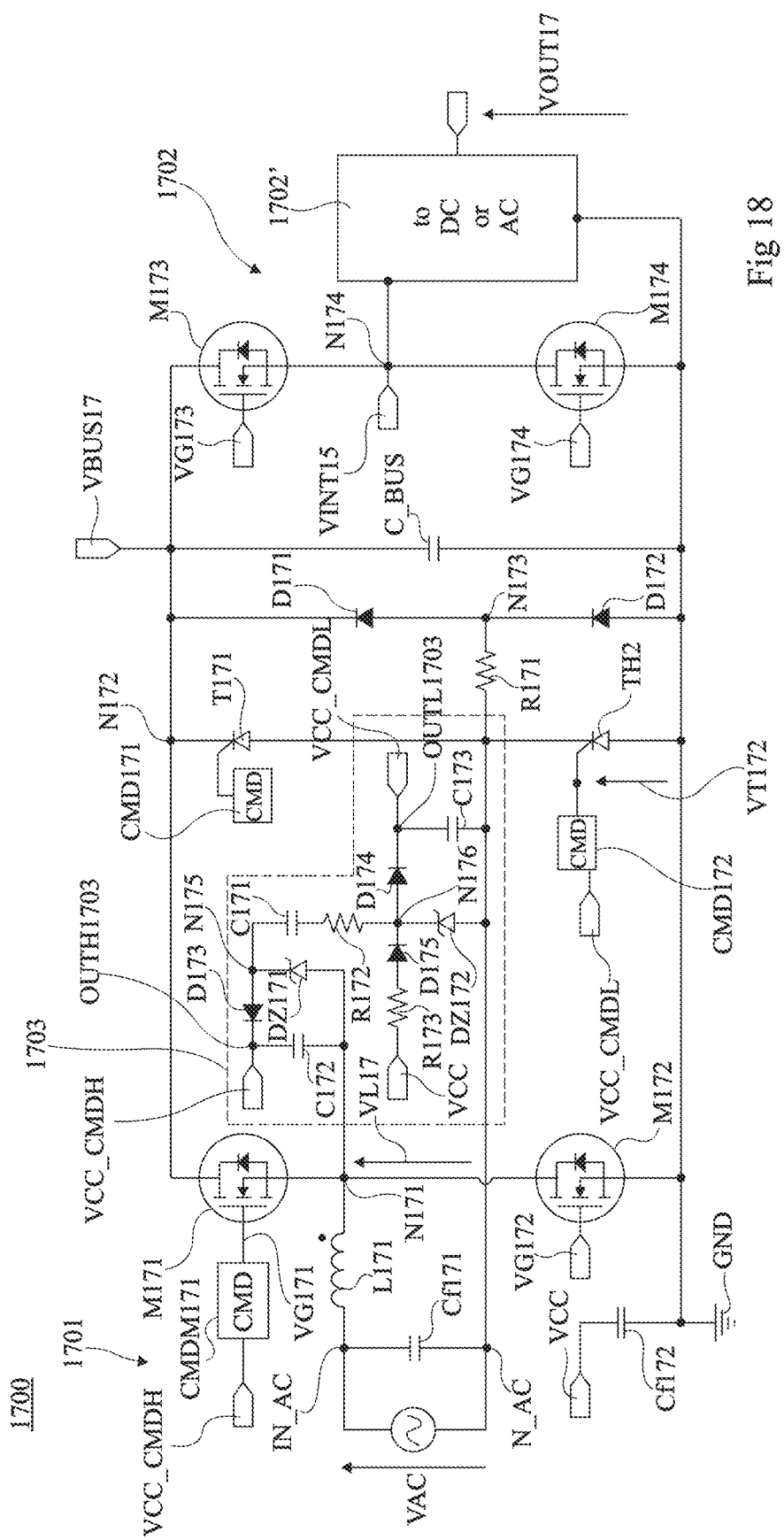
FIG. 18 shows an electric diagram, partially in the form of blocks, of a fourth embodiment of a voltage converter.

Moreover, and according to a variant, converter 1500 may further comprise a precharge circuit, such as that described in relation with FIG. 18 (with components R171, D171, and D172), which enables from this initial time t160 to charge capacitor C_BUS.

Thus, at time t161, the voltage VBUS15 of curve 1601 has increased and capacitor C153 is charged. The amplitude of voltage VCC_CMDL (curve 1605) reaches a first stage.

From a time t162, subsequent to time t161, the amplitude of ac voltage VAC is negative and exhibits, again, a rising edge, capacitor C153 then being charging (even if this charge is very light and can only be slightly noted in curve 1605).

At a time t163, subsequent to time t162, the voltage of curve 1602 exhibits a sharp rising edge which significantly charges C153. The amplitude of voltage VCC_CMDL (curve 1605) then increases to reach a new stage higher than the first one reached at time t161.

Equivalently, at times t161 and t163, the falling edges of the voltage between nodes VBUS15 and N_AC apply a current flowing from diode DZ152, capacitor C151, resistor R151, and diode D151 to capacitor C152, which charges. The amplitude of voltage VCC_CMDH increases to reach a second stage at time t613, higher than the first stage, for example, of the same order as the second stage of voltage VCC_CMDL.

It should be noted that in the previously-described operation, the falling edge of the voltage between nodes N152 and N_AC at time t161 is caused intentionally to charge capacitor C152.

Thus, at a time t164 or even as soon as time t163, voltages VCC_CMDH and VCC_CMDL are sufficiently high to power the circuits for controlling thyristors T1 and T2.

FIG. 17 comprises two graphs (A) and (B) enabling to illustrate a second embodiment of the converter 1500 described in relation with FIG. 15.

Graphs (A) and (B) comprise curves illustrating the time variation of voltages and current of converter 1500, among which: a curve 1651 showing the time variation of the voltage between nodes N152 and GND, called voltage VBUS15, in FIG. 17 the curve forms part of graph (A); a curve 1652 showing the time variation of the voltage between nodes N152 and N_AC, in FIG. 17 the curve forms part of graph (A); a curve 1653 showing the time variation of the ac input voltage VAC applied between nodes IN_AC and N_AC, in FIG. 17 the curve forms part of graph (A); a curve 1654 showing the time variation of the current flowing through inductance L151, in FIG. 17 the curve forms part of graph (A); a curve 1655 showing the time variation of the power supply voltage VCC_CMDL supplied by circuit 1503, that is, the voltage between nodes OUTL1403 and N_AC, in FIG. 17 the curve forms part of graph (B); a curve 1656 showing the time variation of the power supply voltage VCC_CMDH supplied by circuit 1503, that is, the voltage between nodes OUTH1403 and N152, in FIG. 17 the curve forms part of graph (B); a curve 1657 showing the time variation of the control voltage VT151 supplied to thyristor T151 by control circuit CMD151, in FIG. 17 the curve forms part of graph (B); a curve 1658 showing the time variation of the control voltage VT152 supplied to thyristor T152 by control circuit CMD152, in FIG. 17 the curve forms part of graph (B); and a curve 1659 showing the time variation of the voltage between the gate and the source of transistor M151, that is, the voltage between nodes N152 and N151, in FIG. 17 the curve forms part of graph (B).

Before an initial time t165, converter 200 receives no ac voltage VAC to be converted. The voltages and current having their variation shown by curves 1651 and 1652 and 1654 to 1659 are in a quiescent state. More particularly, the voltages of curves 1651, 1652, 1656 to 1659 all have an amplitude close to 0 V and the current of curve 1654 has an amplitude in the order of 0 A.

From initial time t165, and until a time t166, subsequent to time t165, converter 1500 starts receiving the ac voltage VAC to be converted and starts. During this phase, and according to an example, the amplitude of voltage AC is positive and exhibits a rising edge, capacitor C153 is charged by using the voltage between nodes N152 and N_AC (curve 1652), which increases at the same time as ac voltage VAC. Thus, at time t161, the voltage VBUS151 of curve 1651 has increased.

Capacitor C153 is charged. The amplitude of voltage VCC_CMDL (curve 1655) is at a first stage.

From a time t167, subsequent to time t166, the amplitude of the voltage between nodes N152 and N_AC exhibits, again, a rising edge, capacitor C153 then is charging, and the amplitude of voltage VCC_CMDH increases to reach a first stage.

At a time t168, subsequent to time t167, corresponding to the start-up of the power factor correction circuit, and in particular to the turning on of transistor M151, the amplitude of the voltage between nodes N152 and N_AC becomes decreasing. Capacitor C152 is charged and the amplitude of voltage VCC_CMDH increases to reach a second stage, higher than the first stage.

Thus, at a time t169, voltages VCC_CMDH and VCC_CMDL are sufficiently high to power the control circuits of thyristors T1 and T2.

FIG. 18 is a fourth example of embodiment of a voltage converter 1700 of the type of the voltage converter 100 described in relation with FIG. 1. More particularly, FIG. 18 is an electric diagram, partially in the form of blocks, of voltage converter 1700.

Like the voltage converter 100 of FIG. 1, converter 1700 comprises: a first converting stage 1701; a second converting stage 1702 (to DC or AC), shown in the form of a block; a circuit 1703 configured to convert an internal potential VINT17 of first converting stage 1701 into a power supply voltage.

As described in relation with FIG. 1, first converting stage 1701 receives ac input voltage VAC and outputs an intermediate voltage VBUS17. Second converting stage 1702 receives intermediate voltage VBUS17 and the reference potential of node GND and provides the output voltage VOUT17. Circuit 1703 receives another internal voltage VL17 of converting stage 1701 to provide two power supply voltages VCC_CMDL and VCC_CMDH. A variant of converter 1700 where circuit 1703 only supplies a single power supply voltage is described in relation with FIG. 20.

First converting stage 1701 comprises two input nodes IN_AC and N_AC receiving ac input voltage VAC.

Stage 1701 further comprises a power factor correction circuit comprising an inductance L171 and two N-type MOS transistors M171 and M172. A first terminal of inductance L171, or input terminal of inductance L171, is coupled, preferably connected, to node IN_AC, and a second terminal of inductance L171, or output terminal of inductance L171, is coupled, preferably connected, to a node N171. The source of transistor M171 is coupled, preferably connected, to a node N171 and the drain of transistor M171 is coupled, preferably connected, to a node N172. The gate of transistor M171 receives a control potential VG171. According to an example, control potential VG171 is supplied by a control circuit CMDM171 (CMD) receiving power supply voltage VCC_CMDH. This circuit is optionally powered with voltage VCC_CMDH. The source of transistor M172 is coupled, preferably connected, to a node N171 and the drain of transistor M172 is coupled, preferably connected, to a node GND receiving the reference potential, for example, the ground. The gate of transistor M172 receives a control potential VG172.

Voltage VL17 corresponds to the voltage between nodes N171 and N_AC.

Stage 1701 further comprises two thyristors T171 and T172 and their respective control circuits CMD171 (CMD) and CMD172 (CMD). Thyristor T171 has its cathode coupled, preferably connected, to a node N172, and its anode coupled, preferably connected, to node N_AC. The gate of thyristor T171 is coupled, preferably connected, to an output of control circuit CMD171. Control circuit CMD171 is powered with a voltage not shown in FIG. 18. Thyristor T172 has its cathode coupled, preferably connected, to a node N_AC, and its anode coupled, preferably connected, to node GND. The gate of thyristor T172 is coupled, preferably connected, to an output of control circuit CMD172. Control circuit CMD172 is powered with the voltage VCC_CMDL delivered by circuit 1703. More detailed examples of control circuits CMD171 and CMD172 are described in relation with FIGS. 3 and 4.

First converting stage 1701 further comprises a capacitor C_BUS placed between nodes N172 and GND, but also optionally comprises one or a plurality of filtering capacitors, among which: a capacitor Cf171 placed between nodes IN_AC and N_AC; and a capacitor Cf172 placed between node GND and a node receiving a dc power supply potential VCC of converter 1700.

The voltage across capacitor C_BUS is noted VBUS17.

The first stage further comprises an optional precharge circuit formed of two diodes D171 and D172 placed in series between nodes N172 and GND, and of a resistor R171. More particularly, the cathode of diode D171 is coupled, preferably connected, to node N172 and the anode of diode D171 is coupled, preferably connected, to a node N173. The cathode of diode D172 is coupled, preferably connected, to node N173 and the anode of diode D171 is coupled, preferably connected, to node GND. A first terminal of resistor R171 is coupled, preferably connected, to node N_AC and a second terminal of resistor R171 is coupled, preferably connected, to node N173.

Second converting stage 1702 is of the type of the second converting stage 202 of converter 200 described in relation with FIG. 2.

Second stage 1702 comprises a switching stage comprising two transistors M173 and M174. Transistors M173 and M174 are N-type MOS transistors. The source of transistor M173 is coupled, preferably connected, to a node N174 and the drain of transistor M173 is coupled, preferably connected, to node N172. The gate of transistor M173 receives a control potential VG173. The source of transistor M174 is coupled, preferably connected, to node GND and the drain of transistor M174 is coupled, preferably connected, to node N174. The gate of transistor M174 receives a control potential VG174. The intermediate voltage VBUS17 supplied by stage 1701 is the potential difference between nodes N174 and GND.

The rest of second stage 1702 is represented by a block 1702' (to DC or AC).

Circuit 1703 comprises an input node coupled, preferably connected, to node N171 of converter 1700 and outputs, on a first output node OUTH1703, power supply voltage VCC_CMDH and, on a second output node OUTL1703, power supply voltage VCC_CMDL. Circuit 1703 is further coupled, preferably connected, to input node N_AC of converter 1700. Power supply voltage VCC_CMDL is used to power the control circuits of thyristors of first stage 1701, and voltage VCC_CMDH is used to power the control circuit of a transistor of first stage 1701. According to a variant, not shown in FIG. 20, circuit 1703 may only supply voltage VCC_CMDL.

Circuit 1703 comprises, between node N171 and node N_AC, a Zener diode DZ171, a capacitor C171, a resistor R172, and a Zener diode DZ172. More particularly, the anode of Zener diode DZ171 is coupled, preferably connected, to node N171 and the cathode of diode DZ171 is coupled, preferably connected, to a node N175. A first electrode of capacitor C171 is coupled, preferably connected, to node N175 and a second electrode of capacitor C171 is coupled, preferably connected, to a first terminal of resistor R172. A second terminal of resistor R172 is coupled, preferably connected, to a node N176. The cathode of diode DZ172 is coupled, preferably connected, to node N176 and the anode of diode DZ172 is coupled, preferably connected, to node N_AC.

Circuit 1703 further comprises a capacitor C172 and a diode D173. More particularly, a first electrode of capacitor C172 is coupled, preferably connected, to node OUTH173, and a second electrode of capacitor C172 is coupled, preferably connected, to node N171. The cathode of diode D173 is coupled, preferably connected, to node OUTH1703 and the anode of diode D173 is coupled, preferably connected, to a node N175.

Circuit 1703 further comprises a capacitor C173 and a diode D174. More particularly, a first electrode of capacitor C173 is coupled, preferably connected, to node OUTL1703 and a second electrode of capacitor C173 is coupled, preferably connected, to node N_AC. The cathode of diode D174 is coupled, preferably connected, to node OUTL1703 and the anode of diode D174 is coupled, preferably connected, to a node N176.

Circuit 1703 further comprises a resistor R173 and a diode D175. A first terminal of resistor R173 is coupled, preferably connected, to the node receiving power supply potential VCC, and a second terminal of resistor R173 is coupled, preferably connected, to the anode of diode D175. The cathode of diode D175 is coupled, preferably connected, to node N176.

Figure 19:
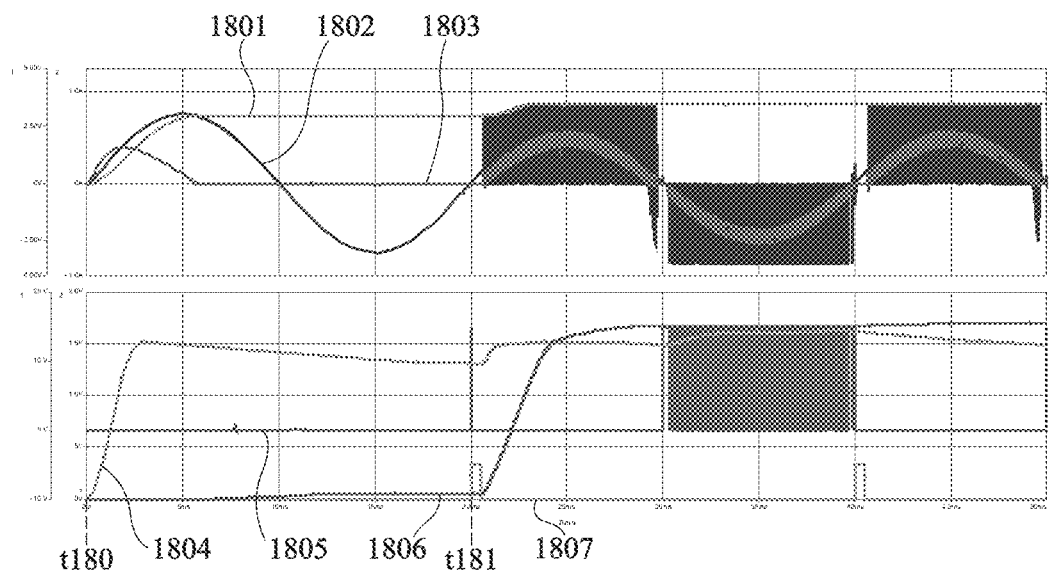
FIG. 19 shows two sets of curves illustrating the operation of the converter of FIG. 18.

The operation of converter 1700 is described in relation with FIG. 19.

FIG. 19 comprises two graphs (A) and (B) enabling to illustrate the operation of a converter 1700 described in relation with FIG. 18.

Graphs (A) and (B) comprise curves illustrating the time variation of voltages and current of converter 1700, among which: a curve 1801 showing the time variation of the voltage between nodes N172 and GND, called voltage VBUS17, in FIG. 19 the curve forms part of graph (A); a curve 1802 showing the time variation of the voltage between nodes N171 and N_AC, called voltage VL17, in FIG. 19 the curve forms part of graph (A); a curve 1803 showing the time variation of the current flowing through inductance L171, in FIG. 19 the curve forms part of graph (A); a curve 1804 showing the time variation of the power supply voltage VCC_CMDL supplied by circuit 1703, that is, the voltage between nodes OUTL1703 and N_AC, in FIG. 19 the curve forms part of graph (B); a curve 1805 showing the time variation of the power supply voltage VCC_CMDH supplied by circuit 1703, that is, the voltage between nodes OUTH1403 and N171, in FIG. 19 the curve forms part of graph (B); a curve 1806 showing the time variation of the voltage between the gate of transistor M171 and node N171, in FIG. 19 the curve forms part of graph (B); and a curve 1807 showing the time variation of the control voltage VT172 supplied to thyristor T172 by control circuit CMD172, in FIG. 19 the curve forms part of graph (B).

Before an initial time t180, converter 200 receives no ac voltage VAC to be converted. The voltages and current having their variation shown by curves 1801 to 1807 are in a quiescent state. More particularly, the voltages of curves 1801, 1802, 1804 to 1807 all have an amplitude close to 0 V, or even lower than 0 V, and the current of curve 1803 has an amplitude in the order of 0 A.

From initial time t180, and until a time t181, subsequent to time t180, converter 200 starts receiving the ac voltage VAC to be converted and starts. During this phase, the amplitude of voltage VCC_CMDL increases due to the voltage provided through resistor R173, diodes D171 and D172, and resistor R171. The power factor correction circuit is starting.

At time t181, the power factor correction circuit starts and the current flowing through inductance L171 is sinusoidal (curve 1803). When the current flowing through inductance L171 is positive, voltage VL17 (curve 1802) is positive, and when the current flowing through inductance L171 is negative, voltage VL17 is negative. Before the power factor correction circuit has started, voltage VCC_CMDL (curve 1804) is sufficiently high to supply circuit CMD172 for controlling thyristor T172.

Figure 20:
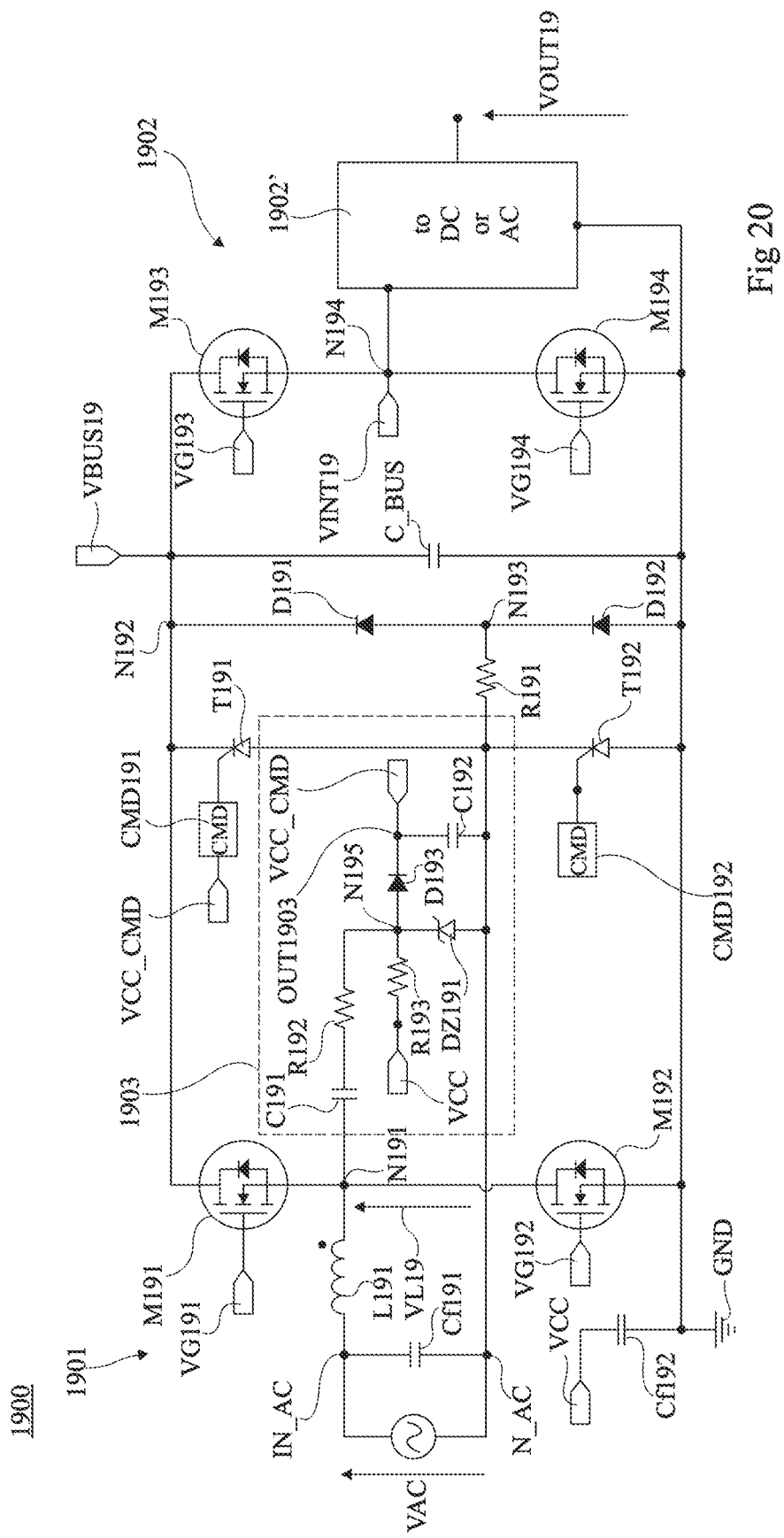
FIG. 20 shows an electric diagram, partially in the form of blocks, of a fifth embodiment of a voltage converter.

FIG. 20 is a fourth example of embodiment of a voltage converter 1900 of the type of the voltage converter 100 described in relation with FIG. 1. More particularly, FIG. 20 is an electric diagram, partially in the form of blocks, of voltage converter 1900.

Like the voltage converter 100 of FIG. 1, converter 1900 comprises: a first converting stage 1901; a second converting stage 1902 (to DC or AC), shown in the form of a block; and a circuit 1903 configured to convert an internal potential VINT19 of first converting stage 1901 into a power supply voltage.

As described in relation with FIG. 1, first converting stage 1901 receives ac input voltage VAC and outputs an intermediate voltage VBUS19. Second converting stage 1902 receives intermediate voltage VBUS19 and the reference potential of node GND and provides the output voltage VOUT19. Circuit 1903 receives another internal voltage VL19 of converting stage 1901 to provide a power supply voltage VCC_CMD.

First converting stage 1901 comprises two input nodes IN_AC and N_AC receiving ac input voltage VAC.

Stage 1901 further comprises a power factor correction circuit comprising an inductance L191 and two N-type MOS transistors M191 and M192. A first terminal of inductance L191 is coupled, preferably connected, to node IN_AC, and a second terminal of inductance L191 is coupled, preferably connected, to a node N191. The source of transistor M191 is coupled, preferably connected, to a node N191, and the drain of transistor M191 is coupled, preferably connected, to a node N192. The gate of transistor M191 receives a control potential VG191. Potential VG191 is supplied by a control circuit, not shown. This circuit is optionally powered with voltage VCC_CMDH. The source of transistor M192 is coupled, preferably connected, to a node N191, and the drain of transistor M192 is coupled, preferably connected, to a node GND receiving a reference potential, for example the ground. The gate of transistor M192 receives a control potential VG192.

Voltage VL19 corresponds to the voltage between nodes N191 and N_AC.

Stage 1901 further comprises two thyristors T191 and T192 and their respective control circuits CMD191 (CMD) and CMD192 (CMD). Thyristor T191 has its cathode coupled, preferably connected, to a node N192, and its anode coupled, preferably connected, to node N_AC. The gate of thyristor T191 is coupled, preferably connected, to an output of control circuit CMD191. Control circuit CMD191 is powered with the voltage VCC_CMD supplied by circuit 1903. Thyristor T192 has its cathode coupled, preferably connected, to a node N_AC, and its anode coupled, preferably connected, to node GND. The gate of thyristor T192 is coupled, preferably connected, to an output of control circuit CMD192. Control circuit CMD192 is powered with a voltage, not shown. More detailed examples of control circuits CMD191 and CMD192 are described in relation with FIGS. 3 and 4.

First converting stage 1901 further comprises a capacitor C_BUS placed between nodes N192 and GND, but also optionally comprises one or a plurality of filtering capacitors, among which: a capacitor Cf191 placed between nodes IN_AC and N_AC; and a capacitor Cf192 placed between node GND and a node receiving a dc power supply potential VCC from converter 200.

The voltage across capacitor C_BUS is noted VBUS19.

The first stage further comprises two diodes D191 and D192 placed in series between nodes N192 and GND, and a diode R191. More particularly, the cathode of diode D191 is coupled, preferably connected, to node N192 and the anode of diode D191 is coupled, preferably connected, to a node N193. The cathode of diode D192 is coupled, preferably connected, to node N193 and the anode of diode D191 is coupled, preferably connected, to a node GND. A first terminal of resistor R191 is coupled, preferably connected, to node N_AC and a second terminal of resistor R191 is coupled, preferably connected, to node N193.

Second converting stage 1902 is of the type of the second converting stage 202 of converter 200 described in relation with FIG. 2.

Second stage 1902 further comprises, eventually, a switching stage comprising two transistors M193 and M194. Transistors M193 and M194 are N-type MOS transistors. The source of transistor M193 is coupled, preferably connected, to a node N194, and the drain of transistor M193 is coupled, preferably connected, to node N192. The gate of transistor M193 receives a control potential VG193. The source of transistor M194 is coupled, preferably connected, to node GND, and the drain of transistor M194 is coupled, preferably connected, to node N194. The gate of transistor M194 receives a control potential VG194.

The rest of second stage 1902 is represented by a block 1902' (to DC or AC).

Circuit 1903 comprises an input node coupled, preferably connected, to node N191 of converter 1900 and outputs, on an output node OUT1903, power supply voltage VCC_CMD. Circuit 1903 is further coupled, preferably connected, to input node N_AC of converter 1900. Power supply voltage VCC_CMD is used to power the control circuits of thyristors of first stage 1901. Circuit 1903 further receives the power supply voltage VCC of converter 1900.

Circuit 1903 comprises, between node N191 and node N_AC, a capacitor C191, a resistor R192, and a Zener diode DZ191. More particularly, a first electrode of capacitor C191 is coupled, preferably connected, to a node N191, and a second electrode of capacitor C191 is coupled, preferably connected, to a first terminal of resistor R192. A second terminal of resistor R192 is coupled, preferably connected, to a node N195. The cathode of diode DZ191 is coupled, preferably connected, to node N195 and the anode of diode DZ191 is coupled, preferably connected, to node N_AC.

Circuit 1903 further comprises a capacitor C192 and a diode D193. More particularly, a first electrode of capacitor C192 is coupled, preferably connected, to node OUT1903, and a second electrode of capacitor C192 is coupled, preferably connected, to node N_AC. The cathode of diode D193 is coupled, preferably connected, to node OUT1903 and the anode of diode D193 is coupled, preferably connected, to a node N195.

Circuit 1903 further comprises a resistor R193 placed between node N195 and the node receiving power supply potential VCC.

Various embodiments and variants have been described. Those skilled in the art will understand that certain features of these various embodiments and variants may be combined, and other variants will occur to those skilled in the art.

The precharge circuit described in relation with FIG. 11 may be applied to the embodiments of FIGS. 18 and 20.

Finally, the practical implementation of the described embodiments and variations is within the abilities of those skilled in the art based on the functional indications given hereabove.

The invention claimed is:

1. A converter circuit for converting a first ac voltage into a second voltage, comprising:
    a first thyristor;
    a first control circuit configured to control the first thyristor;
    a power factor corrector circuit comprising a coil; and
    a first circuit configured to convert a third voltage into a fourth dc voltage;
    wherein the third voltage corresponds to a difference between a potential at a first node coupled to an output node of the coil and a reference potential; and
    wherein the fourth dc voltage is configured to supply the first control circuit, and is referenced to said reference potential.

2. The converter circuit according to claim 1, wherein the first circuit comprises:
    a second node configured to receive the third voltage;
    a third node configured to supply the fourth dc voltage; and
    a fourth node configured to receive the reference potential.

3. The converter circuit according to claim 2, wherein the first circuit further comprises:
    a first bipolar transistor having a collector coupled to the second node and an emitter coupled to the third node;
    a first Zener diode having an anode coupled to the third node and a cathode coupled to a base of the first bipolar transistor;
    a second Zener diode having an anode coupled to the fourth node and a cathode coupled to the base of the first bipolar transistor; and
    a first capacitor coupling the third node to the fourth node.

4. The converter circuit according to claim 2, wherein the first circuit further comprises:
    a second capacitor having a first electrode coupled to the second node;
    a third Zener diode having an anode coupled to the fourth node and a cathode coupled to a second electrode of the second capacitor;
    a first diode having an anode coupled to the anode of the third Zener diode and a cathode coupled to the third node; and a third capacitor coupling the third node to the fourth node.

5. The converter circuit according to claim 4, wherein the first circuit further comprises a precharge circuit comprising a second diode having a cathode coupled to the third node and an anode coupled to a fifth node configured to receive a supply voltage of the convertor circuit.

6. The converter circuit according to claim 2, wherein the first circuit further comprises:
   a fourth Zener diode having an anode coupled to the second node;
   a fourth capacitor having a first electrode coupled to a cathode of the fourth Zener diode;
   a fifth Zener diode having an anode coupled to the fourth node and a cathode coupled to a second electrode of the fourth capacitor;
   a third diode having an anode coupled to the cathode of the fifth Zener diode and a cathode coupled to the third node;
   a fifth capacitor coupling the third node and the fourth node;
   a sixth diode having an anode coupled to the cathode of the fourth Zener diode and a cathode coupled to the fourth node; and
   a sixth capacitor coupling the fourth node with the second node.

7. The converter circuit according to claim 6, wherein first circuit is configured to further furnish a fifth DC voltage configured to supply a second circuit of a second transistor of NMOS-type being part of the power factor corrector circuit.

8. The converter circuit according to claim 1, wherein the first node is the output node of the coil.

9. The converter circuit according to claim 1, wherein the first node is coupled to the output node of the coil via at least one NMOS-type transistor.

10. The converter circuit according to claim 5, wherein the first node is coupled to the output node of the coil via a diode.

11. The converter circuit according to claim 1, wherein the first node is coupled to the output node of the coil via at least two NMOS-type transistors.

12. The converter circuit according to claim 1, wherein the first thyristor, the first control circuit of the first thyristor, and the power factor corrector circuit comprising the coil form a first converting stage, and wherein the first node is an output node of the first converting stage.

13. The converter circuit according to claim 1, further comprising a second thyristor and a second control circuit.

14. The converter circuit according to claim 1, wherein the second voltage is an ac voltage.

15. The converter circuit according to claim 1, wherein the second voltage is a dc voltage.

* * * * *